(12) United States Patent
Shimamura et al.

(10) Patent No.: US 8,765,269 B2
(45) Date of Patent: Jul. 1, 2014

(54) HIGH STRENGTH STEEL PIPE FOR LOW-TEMPERATURE USAGE HAVING EXCELLENT BUCKLING RESISTANCE AND TOUGHNESS OF WELDED HEAT AFFECTED ZONE AND METHOD FOR PRODUCING THE SAME

(75) Inventors: Junji Shimamura, Okayama (JP); Nobuyuki Ishikawa, Kanagawa (JP); Mitsuhiro Okatsu, Okayama (JP); Nobuo Shikanai, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/147,992

(22) PCT Filed: Feb. 5, 2010

(86) PCT No.: PCT/JP2010/052118
§ 371 (c)(1),
(2), (4) Date: Oct. 10, 2011

(87) PCT Pub. No.: WO2010/090349
PCT Pub. Date: Aug. 12, 2010

(65) Prior Publication Data
US 2012/0018028 A1    Jan. 26, 2012

(30) Foreign Application Priority Data
Feb. 6, 2009   (JP) ................... 2009-025477

(51) Int. Cl.
| | | |
|---|---|---|
| *C22C 38/00* | (2006.01) | |
| *B21B 1/38* | (2006.01) | |
| *B21B 3/00* | (2006.01) | |
| *B21C 37/08* | (2006.01) | |
| *C21D 8/02* | (2006.01) | |
| *C22C 38/58* | (2006.01) | |
| *B23K 9/025* | (2006.01) | |
| *B23K 9/23* | (2006.01) | |

(52) U.S. Cl.
USPC ........... 428/684; 428/682; 428/683; 428/681; 420/91; 420/105; 420/108; 420/120; 420/122; 420/123; 420/121; 420/127

(58) Field of Classification Search
USPC ............. 420/89–93, 104–116, 121–124, 420/126–129; 428/681–684
See application file for complete search history.

(56) References Cited

U.S. PATENT DOCUMENTS

2007/0205001 A1 *  9/2007  Shuster et al. ............. 166/380
2007/0269335 A1 * 11/2007  Usami et al. ............... 420/93

(Continued)

FOREIGN PATENT DOCUMENTS

| EP | 2 006 407 | * 12/2008 | ............. C22C 38/00 |
| JP | 2003-293078 A | 10/2003 | |

(Continued)

OTHER PUBLICATIONS

"Microstructure and Toughness of Weld Heat Affected Zone in Quenched-Tempered High Strength Steels", *Journal of the Japan Welding Society*, No. 50 (1981), a copy of partial English translation of Chapter 1 Introduction.

*Primary Examiner* — Gwendolyn Blackwell
*Assistant Examiner* — Lucas Wang
(74) *Attorney, Agent, or Firm* — DLA Piper LLP (US)

(57) ABSTRACT

An APIX100-grade high strength steel pipe includes a base material containing, in mass percentage, C: more than 0.03% and 0.08% or less, Si: 0.01% to 0.5%, Mn: 1.5% to 3.0%, P: 0.015% or less, S: 0.005% or less, Al: 0.01% to 0.08%, Nb: 0.005% to 0.025%, Ti: 0.005% to 0.025%, N: 0.001% to 0.010%, O: 0.005% or less, and B: 0.0003% to 0.0020%, further contains one or more of Cu, Ni, Cr, Mo, and V, satisfies $0.19 \leq P_{cm} \leq 0.25$, the balance being Fe and unavoidable impurities, and has a TS of 760 to 930 MPa, a uniform elongation of 5% or more, and a YR of 85% or less; the seam weld metal has a specific composition.

15 Claims, 2 Drawing Sheets

(56) References Cited

U.S. PATENT DOCUMENTS

2008/0247900 A1* 10/2008 Hayashi et al. ............... 420/84
2009/0025835 A1* 1/2009 Hara et al. .................... 148/521

FOREIGN PATENT DOCUMENTS

| | | | |
|---|---|---|---|
| JP | 2003-306749 A | 10/2003 | |
| JP | 2004-131799 A | 4/2004 | |
| JP | 2006-328523 A | 7/2006 | |
| JP | 2006-233263 A | 9/2006 | |
| JP | 2006-265577 A | 10/2006 | |
| JP | 2009-001909 * | 1/2008 | .............. C21D 9/46 |
| JP | 2008-056961 A | 3/2008 | |
| JP | 2008-248328 A | 10/2008 | |
| JP | 2008-248330 A | 10/2008 | |

* cited by examiner

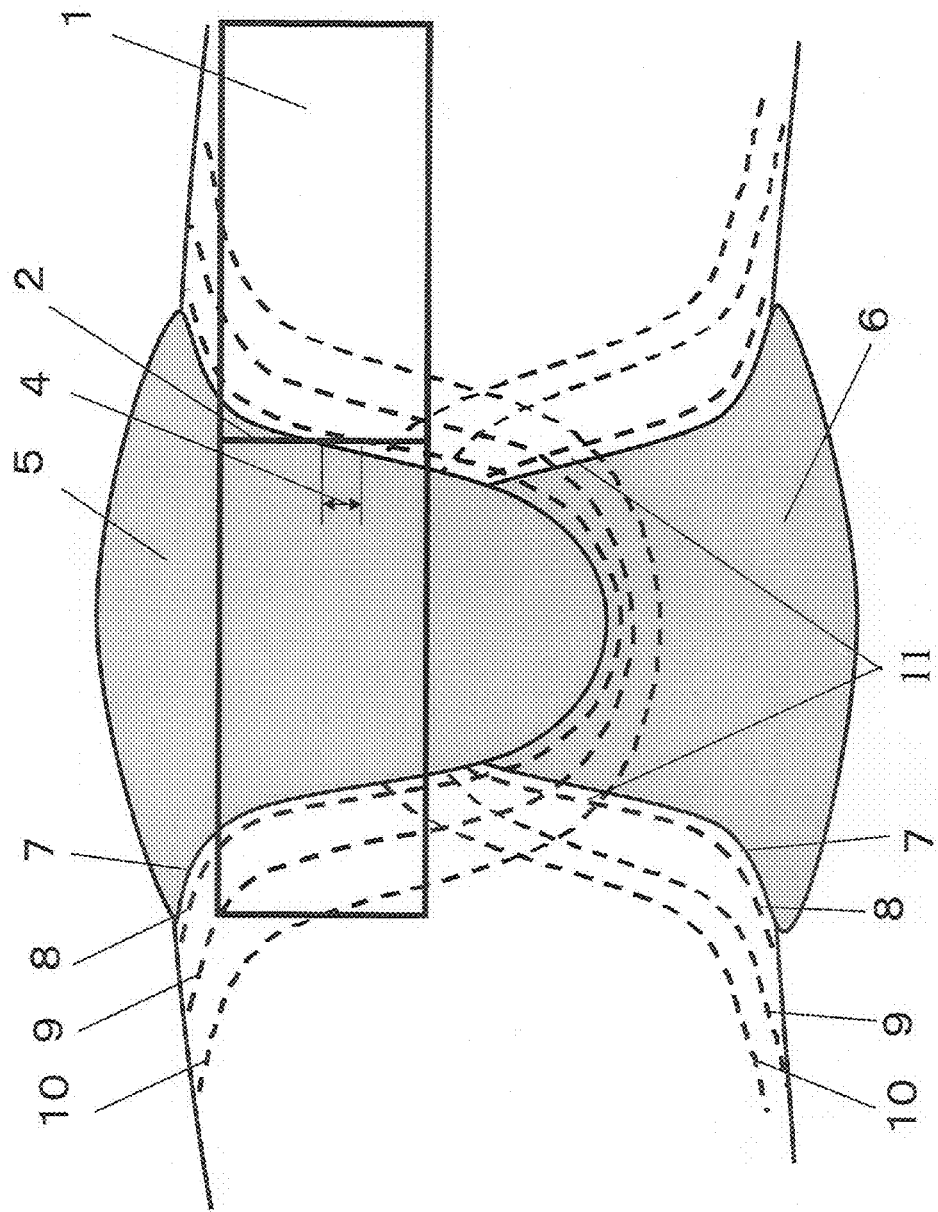

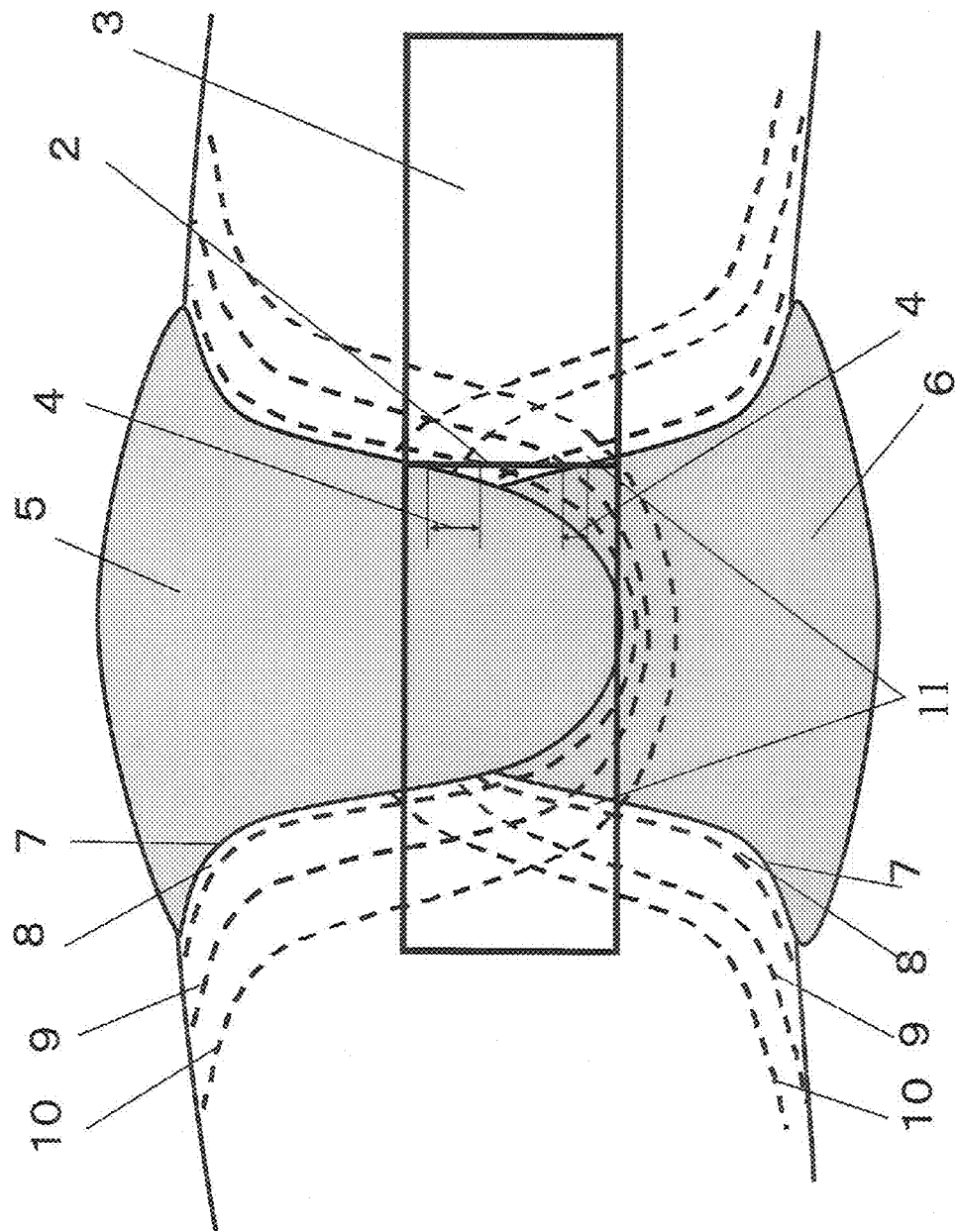
Fig. 1-B

HIGH STRENGTH STEEL PIPE FOR LOW-TEMPERATURE USAGE HAVING EXCELLENT BUCKLING RESISTANCE AND TOUGHNESS OF WELDED HEAT AFFECTED ZONE AND METHOD FOR PRODUCING THE SAME

RELATED APPLICATIONS

This is a §371 of International Application No. PCT/JP2010/052118, with an international filing date of Feb. 5, 2010 (WO 2010/090349 A1, published Aug. 12, 2010), which is based on Japanese Patent Application No. 2009-025477, filed Feb. 6, 2009.

TECHNICAL FIELD

This disclosure relates to high strength steel pipes having a strength of the X100 grade of American Petroleum Institute (API), in particular, to high strength steel pipes that have a plate thickness of about 20 to 40 mm, are suitable as steel pipes for transporting natural gas and crude oil in seismic regions where ground deformation severely occurs and permafrost regions, and are excellent in terms of buckling resistance and toughness of a welded heat affected zone.

BACKGROUND ART

In recent years, welded steel pipes used for transporting natural gas and crude oil have been required to achieve enhancement of transport efficiency by using a higher pressure and enhancement of efficiency of performing on-site welding by decreasing the wall thickness of the pipes. Accordingly, welded steel pipes having a higher strength and a larger wall thickness are provided year by year.

In addition, since steel pipes have come to be used in cold regions where ground deformation occurs, low-temperature toughness of weld zones and buckling resistance are required to be enhanced and there is a demand for the development of a X100-grade thick-wall steel pipe satisfying such requirements.

In chemical composition design of high strength steel plates used for X100-grade steel pipes, addition of B is effective to achieve sufficiently high strength and toughness. However, in the case of steel pipes, it is also important to satisfy welding properties such as cold cracking susceptibility. Accordingly, in chemical composition design of X100-grade steel pipes, to prevent cold cracking in circumferential weld zones that are formed by low heat input welding and connect steel pipes together, a chemical composition design in which boron (B) having high hardenability is not added to base steel plates has been basically used (for example, NKK Technical Review No. 138 (1992), pp. 24-31 and NKK Technical Review No. 66 (1992)).

However, it is reported that, with an increase in the strength of steel plates, addition of B results in excellent toughness of seam-weld heat affected zones depending on welding heat input to seam weld zones (for example, Journal of Japan Welding Society No. 50 (1981)). Japanese Unexamined Patent Application Publication No. 2006-328523 discloses that, in seam weld zones of steel pipes, diffusion of B contained in weld metal into base material results in enhancement of toughness of seam-weld heat affected zones near fusion lines.

In welded heat affected zones of B-added high strength steel, even when a prior austenite grain size in regions relatively away from fusion lines is a small size of 150 μm or less, there are cases where an upper bainite structure containing a large amount of island martensite (also referred to as MA: Martensite-Austenite Constituent), which is detrimental to toughness, becomes dominant and toughness is degraded. Thus, in high strength steel, the influence of addition of B on the toughness of welded heat affected zones is not sufficiently understood.

In chemical composition design of an X100-grade steel pipe having a large wall thickness of more than 20 mm, to ensure strength, toughness, deformability, and circumferential weldability and to ensure excellent low-temperature toughness of welded heat affected zones in seam weld zones, the influence of addition of B on the structure of welded heat affected zones has been intensively studied.

Japanese Unexamined Patent Application Publication Nos. 2008-56961, 2004-131799, 2003-306749 and 2003-293078 relate to high strength welded steel pipes and production methods of high strength welded steel pipes and state that, when B is added to base material compositions, an appropriate amount of B is added in consideration of the toughness of welded heat affected zones. In addition, JP '749 and JP '078 propose that, when the alloy amount in base material is made appropriate, different parameter formulae are used depending on whether B is added or not.

Over that period, there are cases where API X100-grade high strength welded steel pipes are required to have buckling resistance, which is not sufficiently discussed in JP '961, JP '799, JP '749 and JP '078. For example, JP '961 discloses a technique of enhancing the toughness of welded heat affected zones. However, deformability of base material is not studied in JP '961.

JP '799 deals with the X80 grade, which is a strength level different from that discussed in the present invention. JP '749 and JP '078 define the uniform elongation of a base material portion in a tensile test in a pipe axis direction. As described below, it is important to make the ratio (YR:yield ratio) of 0.5% proof strength to tensile strength be low for enhancing buckling resistance, which is not studied in JP '749 and JP '078.

Welded steel pipes used as line pipes such as UOE steel pipes and ERW steel pipes are produced by subjecting steel plates to cold forming into pipes and to welding of abutting portions, and then generally subjecting the external surface of the steel pipe to a coating treatment in view of corrosion resistance and the like. Accordingly, due to strain caused by working in the formation of pipes and heating in the coating treatment, strain ageing is caused and the 0.5% proof strength increases. Thus, a steel pipe having been subjected to the coating treatment has a yield ratio higher than that of steel plates, which is problematic. However, this respect is not solved by the techniques described in Patent Literatures 1 to 5. Accordingly, there is a demand for a high strength welded steel pipe that has a low yield ratio even after the coating treatment and, as a result, has high buckling resistance.

It could therefore be helpful to reveal the influence of addition of B to base steel plates used for API X100-grade thick-wall steel pipes on weldability and the toughness of welded heat affected zones and provide an API X100-grade high strength steel pipe for low-temperature usage that is excellent in terms of buckling resistance and toughness of welded heat affected zones, has a wall thickness of 20 mm or more, has base material properties in which the tensile strength is 760 MPa or more and 930 MPa or less, the uniform elongation is 5% or more, and a ratio (YR:yield ratio) of 0.5% proof strength to tensile strength is 85% or less, and has a charpy absorbed energy of 100 J or more in the weld bond at −30° C. In consideration of buckling resistance after a coating treatment, it could also be helpful to provide a high strength welded steel pipe that has strength characteristics and deformability equivalent to those described above even after the steel pipe is subjected to a coating treatment.

SUMMARY

We thus provide:

1. A high strength steel pipe for low-temperature usage that is excellent in terms of buckling resistance and toughness of a welded heat affected zone, the high strength steel pipe including:
   a base material portion in which a base material has a composition containing, in mass percentage,
   C: more than 0.03% and 0.08% or less, Si: 0.01% to 0.5%,
   Mn: 1.5% to 3.0%, P: 0.015% or less, S: 0.003% or less, Al: 0.01% to 0.08%, Nb: 0.005% to 0.025%, Ti: 0.005% to 0.025%, N: 0.001% to 0.010%, O: 0.005% or less, and B: 0.0003% to 0.0020%
   and further containing one or more of Cu: 0.01% to 1%, Ni: 0.01% to 1%, Cr: 0.01% to 1%, Mo: 0.01% to 1%, and V: 0.01% to 0.1%,
   a $P_{CM}$ value (in %) calculated by a formula (1) below satisfies $0.19 \leq P_{CM} \leq 0.25$, the balance is Fe and unavoidable impurities,
   the base material has tensile characteristics of a tensile strength of 760 MPa or more and 930 MPa or less, a uniform elongation of 5% or more, and a yield ratio of 85% or less, and a charpy absorbed energy at a test temperature of −40° C. is 210 J or more in a case where a plate thickness is less than 25 mm and is 150 J or more in a case where the plate thickness is 25 mm or more; and
   a weld metal portion in which weld metal for seam welding has a composition containing, in mass percentage, C: 0.03% to 0.10%, Si: 0.5% or less, Mn: 1.5% to 3.0%, P: 0.015% or less, S: 0.005% or less, Al: 0.05% or less, Nb: 0.005% to 0.05%, Ti: 0.005% to 0.03%, N: 0.010% or less, O: 0.015% to 0.045%, and B: 0.0003% to 0.0050%
   and further containing one or more of Cu: 0.01% to 1%, Ni: 0.01% to 2.5%, Cr: 0.01% to 1%, Mo: 0.01% to 1.5%, and
   V: 0.1% or less, and
   the balance is Fe and unavoidable impurities,
   wherein a microstructure of a welded heat affected zone in which a prior austenite grain size is 50 μm or more near a fusion line in a seam weld zone of the steel pipe is a lower bainite structure or a multi-phase structure containing lower bainite having an area fraction of 50% or more and upper bainite and/or martensite, $$P_{CM}(\%) = C + Si/30 + Mn/20 + Cu/20 + Ni/60 + Cr/20 + Mo/15 + V/10 + 5 \times B \quad (1)$$

where each element represents content (mass %).

2. The high strength steel pipe for low-temperature usage that is excellent in terms of buckling resistance and toughness of a welded heat affected zone according to 1, wherein, in the seam weld zone of the steel pipe in which a layer on an internal side and a layer on an external side are welded in a longitudinal direction of the steel pipe, the welded heat affected zone near the fusion line on the external side has a hardness satisfying a formula (2) below, $$250 \leq HV(98N) \leq 350 \quad (2)$$

where HV(98N) represents a Vickers hardness measured with 10 kgf.

3. The high strength steel pipe for low-temperature usage that is excellent in terms of buckling resistance and toughness of a welded heat affected zone according to 1 or 2, wherein the seam weld zone of the steel pipe has a joint strength of 760 MPa or more and 930 MPa or less.

4. The high strength steel pipe for low-temperature usage that is excellent in terms of buckling resistance and toughness of a welded heat affected zone according to any one of 1 to 3, wherein a microstructure of the base material portion of the steel pipe is mainly constituted by a bainite structure containing island martensite having an area fraction of 4% or more and 12% or less, the island martensite contained has a long axis size of 2 μm or less, and bainitic ferrite surrounded by boundaries having a misorientation of 15° or more in the microstructure of the base material portion has a long axis size of 20 μm or less.

5. The high strength steel pipe for low-temperature usage that is excellent in terms of buckling resistance and toughness of a welded heat affected zone according to any one of 1 to 4, wherein the chemical composition of the base material portion and/or the weld metal portion further contains, in mass percentage, one or more of Ca: 0.0005% to 0.01%, REM: 0.0005% to 0.02%, Zr: 0.0005% to 0.03%, and Mg: 0.0005% to 0.01%.

6. The high strength steel pipe for low-temperature usage that is excellent in terms of buckling resistance and toughness of a welded heat affected zone according to 4 or 5, wherein the steel pipe has a uniform elongation of 5% or more and a yield ratio of 85% or less even after the steel pipe is subjected to a strain ageing treatment at a temperature of 250° C. or less for 30 minutes or less.

7. A method for producing a steel plate for a high strength steel pipe for low-temperature usage that is excellent in terms of buckling resistance and toughness of a welded heat affected zone, the method including subjecting a steel having the base material composition according to 1 or 5 to hot rolling such that the steel is heated at a temperature of 1000° C. to 1300° C., a cumulative rolling reduction at more than 950° C. is 10% or more, a cumulative rolling reduction at 750° C. or less is 75% or more, and a finish rolling temperature is 650° C. or more; then subjecting the steel to accelerated cooling to a temperature of 450° C. or more and less than 650° C. at a cooling rate of 10° C./s or more; and, immediately after the accelerated cooling, reheating the steel to a temperature of 500° C. to 750° C. at a heating rate of 0.5° C./s or more, the temperature being equal to or more than a stopping temperature of the accelerated cooling.

8. The method for producing a steel plate for a high strength steel pipe for low-temperature usage that is excellent in terms of buckling resistance and toughness of a welded heat affected zone according to 7, wherein, in the hot rolling, a cumulative rolling reduction at a temperature of more than 750° C. and 950° C. or less is 20% or more.

9. A method for producing a high strength welded steel pipe for low-temperature usage that is excellent in terms of buckling resistance and toughness of a welded heat affected zone, wherein the steel plate obtained by the production method according to 7 or 8 is formed so as to have a pipe shape, and, in welding of abutting portions of the formed steel plate by welding an internal layer and an external layer of the steel plate, internal welding heat input and external welding heat input is each 80 kJ/cm or less, and a heat input balance between the external heat input and the internal heat input satisfies a formula (3) below, $$\text{internal heat input} \leq \text{external heat input} \quad (3).$$

10. The method for producing a high strength welded steel pipe for low-temperature usage according to 9, wherein, after the internal layer and the external layer are welded in a longitudinal direction of the steel pipe, the steel pipe is subjected to pipe expansion at an expansion ratio of 0.4% or more and 2.0% or less.

We also provide an APIX100-grade high strength steel pipe for low-temperature usage, the steel pipe having a wall thickness of 20 mm or more, being excellent in terms of buckling resistance, toughness of base material, and toughness of a welded heat affected zone in a seam weld zone. Accordingly, our steels and methods are considerably advantageous in the industry.

BRIEF DESCRIPTION OF THE DRAWINGS

FIG. 1A is an explanatory view illustrating a notch position 2 of a charpy specimen 1 having an external FL notch in a weld joint charpy test.

FIG. 1B is an explanatory view illustrating a notch position 2 of a charpy specimen 3 having a Root-FL notch in a weld joint charpy test.

| Reference Signs List | |
|---|---|
| 1: | charpy specimen having external FL notch |
| 2: | notch position of charpy specimen |
| 3: | charpy specimen having Root-FL notch |
| 4: | local brittle zone at notch position |
| 5: | external weld metal |
| 6: | internal weld metal |
| 7: | fusion line |
| 8: | coarse-grain HAZ (CGHAZ) in which a prior austenite grain size is 50 μm or more near fusion line |
| 9: | position heated at Ac3 point |
| 10: | position heated at Ac1 point |
| 11: | zone (ICGHAZ) generated by heating internal coarse-grain HAZ structure to a two-phase region (Ac1 point (10) to Ac3 point (9)) |

DETAILED DESCRIPTION

Our high strength steel pipes include steel pipes satisfying all the specifications of the APIX100 grade and steel pipes adjusted to have a tensile strength of the APIX100 grade but have some characteristics not satisfying the API specifications.

We performed thorough studies on how to provide a high strength steel pipe for low-temperature usage that is excellent in terms of buckling resistance and toughness of welded heat affected zones and has a wall thickness of 20 mm or more and found the following:

1. A zone whose toughness is most degraded (referred to as local brittle zone (LBZ)) in a welded heat affected zone (HAZ) in a seam weld zone of a steel pipe has, on the external side, a coarse-grain HAZ (hereafter, referred to as CGHAZ) structure near the bond; and has, in a Root zone on the internal side, an inter-critically coarse-grain HAZ (ICCGHAZ) structure generated by reheating the CGHAZ structure on the internal side to a two-phase region ($Ac_1$ to $Ac_3$ points). These structures were generated from a coarse-grain HAZ (CGHAZ, a zone in which a prior austenite grain size is 50 μm or more near the fusion line). Note that the Root zone denotes a zone including a joint portion where the internal weld metal and the external weld metal cross each other and an area around the portion.

2. By adjusting a $P_{CM}$ value of base material and a cooling rate in a temperature range of 800° C. to 500° C. in which γ (austenite)-α (ferrite) phase transformation occurs in cooling after welding, regardless of the external side or the internal side, a CGHAZ microstructure is made to be a lower bainite structure or a structure mainly constituted by lower bainite in which the area fraction of upper bainite including a large amount of MA, which is a hard phase, and martensite having a high strength is made to be a specific value or less and, as a result, toughness is enhanced. In particular, when a structure in which the area fraction of lower bainite is 50% or more is provided, toughness is most enhanced and charpy absorbed energy at −30° C. is considerably enhanced.

3. To obtain a CGHAZ structure having the above-described microstructure, addition of boron (B) to base material is most effective. When welding heat input is 80 kJ/cm or less (corresponding to a cooling rate of 4° C./sec or more in the range of 800° C. to 500° C.), a preferred amount of B added is in the range of 5 to 15 ppm in a composition satisfying a $P_{CM}$ of 0.19% to 0.25% in which the APIX100-grade strength of base material is ensured.

4. To enhance buckling resistance, at the start of buckling, the limit strain of compressive buckling on the flexural compression side and the limit strain of fracture on the flexural tensile side need to be increased. This is effectively achieved by making the ratio (yield ratio) of 0.5% proof strength to tensile strength be 85% or less and making uniform elongation be 5% or more.

5. When a high strength steel plate having a large thickness of more than 20 mm is subjected to a toughness evaluation test represented by a DWTT, to achieve a ductile fracture surface area ratio of 85% or more at −20° C., which is a target, the size of the microstructure needs to be further reduced, compared with existing microstructures.

6. A coarse island martensite structure promotes generation and propagation of fracture. To ensure desired low-temperature toughness, it is important to accurately control the structure size of island martensite or tempered martensite.

7. The ductile fracture surface area ratio at −20° C. in DWTT (drop weight tear test) in terms of toughness of base material correlates with the size of island martensite. The charpy absorbed energy of base material correlates with the size of island martensite and the bainitic ferrite that serves as the matrix.

8. By making the structure of base material be a bainite structure containing island martensite, strain ageing resistance is enhanced and excellent buckling resistance can be ensured even after a coating treatment. To achieve this, it is important to accurately control the area fraction of island martensite.

We define the composition of base material constituting a steel pipe, the microstructure and tensile strength characteristics of the base material, the composition of weld metal in a seam weld zone of the steel pipe, and the microstructure of a zone in which a prior austenite grain size is 50 μm or more near a fusion line in a longitudinal seam weld zone of the steel pipe.

[Composition of base material] % represents mass % in the description.

C: more than 0.03% and 0.08% or less

C forms a supersaturated solid solution in a low-temperature transformation structure such as a martensite structure or an island martensite structure serving as the second phase to thereby contribute to an increase in strength. To achieve such an effect, C needs to be added in a content of more than 0.03%. When C is added in a content of more than 0.08%, the hardness of the circumferential weld zone of a steel pipe considerably increases and weld cold cracking tends to be caused. Accordingly, the upper limit of the content is made 0.08%. To provide a sufficiently large amount of island martensite that is a hard phase required for controlling a yield ratio to be a low value, C is preferably added in a content of 0.05% or more.

Si: 0.01% to 0.5%

Si is an element that functions as a deoxidizing agent and increases the strength of steel through solution hardening. Such an effect is not provided when the Si content is less than 0.01%. When Si is added in a content of more than 0.5%, toughness is considerably degraded. Accordingly, the upper limit of the Si content is made 0.5%. The Si content is preferably 0.01% to 0.2%. By suppressing the Si content to 0.2% or less, generation of island martensite (MA) contained in an upper bainite structure can be suppressed in a CGHAZ structure in a seam weld zone of a steel pipe to thereby enhance joint HAZ toughness. By suppressing the Si content to 0.2% or less, excessive generation of island martensite in the microstructure of the base material portion of a steel pipe can be suppressed to thereby enhance the toughness of the base material. Accordingly, the upper limit of the Si content is preferably made 0.2%.

Mn: 1.5% to 3.0%

Mn functions as an element that enhances hardenability. Such an effect is provided by adding Mn in a content of 1.5% or more. In a continuous casting process, the concentration of Mn considerably increases in a center segregation region. Addition of Mn in a content of more than 3.0% causes delayed fracture in a center segregation region. Accordingly, the upper limit of the Mn content is made 3.0%. The Mn content is preferably 1.6% to 2.5%.

Al: 0.01% to 0.08%

Al functions as a deoxidizing element. Addition of Al in a content of 0.01% or more sufficiently provides such a deoxidizing effect. When Al is added in a content of more than 0.08%, cleanliness in steel is degraded, which causes degradation of toughness. Accordingly, the upper limit of the Al content is made 0.08%. The Al content is preferably 0.02% to 0.06%.

Nb: 0.005% to 0.025%

Nb provides an effect of widening the austenite non-recrystallization region in hot rolling. To make a region of 950° C. or less be the non-recrystallization region, Nb is added in a content of 0.005% or more. When Nb is added in a content of more than 0.025%, charpy absorbed energy is particularly considerably degraded in the toughness of HAZ and the toughness of base material. Accordingly, the upper limit of the Nb content is made 0.025%. The Nb content is preferably 0.010% to 0.025%.

Ti: 0.005% to 0.025%

Ti forms a nitride and effectively reduces the amount of N forming a solid solution with steel. Precipitated TiN exhibits a pinning effect to suppress coarsening of austenite grains to thereby contribute to enhancement of the toughness of base material and HAZ. To provide the pinning effect, Ti needs to be added in a content of 0.005% or more. When Ti is added in a content of more than 0.025%, Ti forms a carbide and the precipitation hardening considerably degrades the toughness. Accordingly, the upper limit of the Ti content is made 0.025%. The Ti content is preferably 0.008% to 0.020%.

N: 0.001% to 0.010%

N is normally present as an unavoidable impurity in steel. Addition of Ti results in the formation of TiN. To suppress coarsening of austenite grains by the pinning effect provided by TiN, the N content in steel needs to be 0.001% or more. When the N content is more than 0.010%, TiN decomposes in a weld zone, particularly in a region heated at 1450° C. or more in the vicinity of a weld bond, and N forming a solid solution considerably causes adverse effects. Accordingly, the upper limit of the N content is made 0.010%. The N content is preferably 0.002% to 0.005%.

B: 0.0003% to 0.0020%

B is an element that plays an important role. Our steel contains B and hence generation of polygonal ferrite is suppressed. Accordingly, compared with steel containing no B, austenite region rolling can be performed in a low temperature region. As a result, toughness evaluated by the DWTT or the like is enhanced. In addition, B segregates in austenite grain boundaries in welded heat affected zones to thereby enhance hardenability. B suppresses generation of upper bainite containing MA detrimental to toughness to thereby facilitate generation of lower bainite or martensite.

Such an effect is considerably provided when B is added in a content of 0.0003% or more and 0.0020% or less. When B is added in a content of more than 0.0020%, a B-based carbide precipitates and, as a result, the toughness of base material and a welded heat affected zone is degraded. Accordingly, the upper limit of the B content is made 0.0020%. When the B content is less than 0.0003%, an upper bainite structure is considerably generated in a welded heat affected zone. Accordingly, the lower limit of the B content is made 0.0003%. The B content is preferably in the range of 0.0005% or more and 0.0015% or less, more preferably in the range of 0.0007% to 0.0012%.

One or more of Cu, Ni, Cr, Mo, and V

Cu, Ni, Cr, Mo, and V all function as elements that enhance hardenability. Accordingly, to achieve a high strength, one or more of these elements are added.

Cu: 0.01% to 1%

Cu added in a content of 0.01% or more contributes to enhancement of hardenability of steel. However, when Cu is added in a content of 1% or more, degradation of toughness is caused. Accordingly, the upper limit of the Cu content is made 1%. When Cu is added, the Cu content is made 0.01% to 1%, preferably 0.1% to 0.5%.

Ni: 0.01% to 1%

Ni added in a content of 0.01% or more contributes to enhancement of hardenability of steel. Addition of Ni in a large amount does not particularly cause degradation of toughness and Ni is effectively used to enhance toughness. However, Ni is an expensive element. Accordingly, when Ni is added, the upper limit of the Ni content is made 1%. When Ni is added, the Ni content is made 0.01% to 1%, preferably 0.1% to 0.5%.

Cr: 0.01% to 1%

Cr added in a content of 0.01% or more also contributes to enhancement of hardenability of steel. However, when Cr is added in a content of more than 1%, degradation of toughness is caused. Accordingly, the upper limit of the Cr content is made 1%. When Cr is added, the Cr content is made 0.01% to 1%, preferably 0.1% to 0.5%.

Mo: 0.01% to 1%

Mo added in a content of 0.01% or more also contributes to enhancement of hardenability of steel. However, when Mo is added in a content of more than 1%, degradation of toughness is caused. Accordingly, the upper limit of the Mo content is made 1%. When Mo is added, the Mo content is made 0.01% to 1%, preferably 0.1% to 0.5%.

V: 0.01% to 0.1%

V forms a carbonitride to provide precipitation strengthening to thereby particularly contribute to suppression of softening of a welded heat affected zone. Such an effect is provided when V is added in a content of 0.01% or more. However, when V is added in a content of more than 0.1%, precipitation strengthening considerably occurs and toughness is degraded. Accordingly, the upper limit of the V content is made 0.1%. When V is added, the V content is made 0.01% to 0.1%, preferably 0.01% to 0.05%.

O: 0.005% or less, P: 0.015% or less, S: 0.003% or less

O, P, and S are unavoidable impurities and the upper limits of the contents thereof are defined. O suppresses generation of inclusions that are coarse and adversely affect toughness and the O content is made 0.005% or less. When the P content is large, center segregation considerably occurs and the toughness of base material is degraded. Accordingly, the P content is made 0.015% or less. When the S content is large, the amount of MnS generated considerably increases and the toughness of base material is degraded. Accordingly, the S content is made 0.003% or less. The following is preferred. O: 0.003% or less, P: 0.01% or less, S: 0.001% or less $P_{CM}$(%): 0.19 to 0.25

$P_{CM}$ is an index of weld cracking susceptibility represented by C+Si/30+Mn/20+Cu/20+Ni/60+Cr/20+Mo/15+V/10+5× B, where each element represents content (mass %) and an element that is not contained represents zero.

To achieve a base material tensile strength of 760 MPa or more and a joint strength of 760 MPa or more, $P_{CM}$ is made 0.19% or more and 0.25% or less in view of ensuring circumferential weldability. $P_{CM}$ is preferably made 0.23% or less.

The basic composition of the base material portion of our steel pipe has been described so far. To further enhance the toughness of a weld zone, one or more of Ca, REM, Zr, and Mg may be added.

Ca, REM, Zr, and Mg

Ca, REM, Zr, and Mg form an oxysulphide or a carbonitride in steel and suppress coarsening of austenite grains mainly in a welded heat affected zone by the pinning effect. Ca, REM, Zr, and Mg may be added to enhance the toughness.

Ca: 0.0005% to 0.01%

In a steel production process, when Ca is added in a content of less than 0.0005%, a deoxidizing reaction predominantly occurs and it is difficult to provide a sufficiently large amount of CaS. Thus, the effect of enhancing the toughness is not provided. Accordingly, when Ca is added, the lower limit of the Ca content is made 0.0005%.

When Ca is added in a content of more than 0.01%, coarse CaO tends to be generated. Thus, the toughness of base material and the like is degraded and nozzle blockage of a ladle is caused, which degrades productivity. Accordingly, the upper limit of the Ca content is made 0.01%: When Ca is added, the Ca content is made 0.0005% to 0.01%, preferably 0.001% to 0.005%.

REM: 0.0005% to 0.02%

REM forms an oxysulphide in steel. Addition of REM in a content of 0.0005% or more provides the pinning effect of suppressing coarsening in a welded heat affected zone. However, REM is an expensive element and the effect is saturated in addition thereof in a content of more than 0.02%. Accordingly, the upper limit of the REM content is made 0.02%. When REM is added, the REM content is made 0.0005% to 0.02%, preferably 0.001% to 0.005%.

Zr: 0.0005% to 0.03%

Zr forms a carbonitride in steel and provides the pinning effect of suppressing coarsening of austenite grains particularly in a welded heat affected zone. To sufficiently provide the pinning effect. Zr needs to be added in a content of 0.0005% or more. However, when Zr is added in a content of more than 0.03%, cleanliness in steel is considerably degraded and the toughness is degraded. Accordingly, the upper limit of the Zr content is made 0.03%. When Zr is added, the Zr content is made 0.0005% to 0.03%, preferably 0.001% to 0.01%.

Mg: 0.0005% to 0.01%

Mg forms a fine oxide in steel during a steel production process and provides the pinning effect of suppressing coarsening of austenite grains particularly in a welded heat affected zone. To sufficiently provide the pinning effect, Mg needs to be added in a content of 0.0005% or more. However, when Mg is added in a content of more than 0.01%, cleanliness in steel is degraded and the toughness is degraded. Accordingly, the upper limit of the Mg content is made 0.01%. When Mg is added, the Mg content is made 0.0005% to 0.01%, preferably 0.001% to 0.005%.

Composition of weld metal % represents mass % in the description.

C: 0.03% to 0.10%

In weld metal, C is also an important element that strengthens steel. In particular, to achieve over matching in a joint portion, a weld metal portion also needs to have a tensile strength of 760 MPa or more. To achieve this strength, the C content needs to be 0.03% or more: When the C content is more than 0.10%, hot cracking of weld metal tends to be caused. Accordingly, the upper limit of the C content is made 0.10%. The C content is preferably 0.05% to 0.08%.

Si: 0.5% or less

Si is effective to achieve deoxidization of weld metal and to ensure good workability. However, when the Si content is more than 0.5%, welding workability is degraded. Accordingly, the upper limit of the Si content is made 0.5%. The Si content is preferably 0.3% or less.

Mn: 1.5% to 3.0%

Mn is an important element that strengthens weld metal. In particular, to achieve a tensile strength of 760 MPa or more, the Mn content needs to be 1.5% or more. However, when the Mn content is more than 3.0%, weldability is degraded. Accordingly, the upper limit of the Mn content is made 3.0%. The Mn content is preferably 1.6% to 2.5%.

P: 0.015% or less, S: 0.005% or less

P and S segregate in grain boundaries in weld metal to degrade the toughness of the weld metal. Accordingly, the upper limits of the P content and the S content are respectively made 0.015% and 0.005%. The P content and the S content are preferably 0.01% or less and 0.003% or less, respectively.

Al: 0.05% or less

Although Al functions as a deoxidizing element, deoxidization by Ti effectively enhances the toughness of a weld metal portion, compared with Al. In addition, when the amount of inclusions of an Al oxide increases, the charpy absorbed energy of weld metal decreases. Accordingly, Al is not added in a high content and the upper limit of the Al content is made 0.05%. The Al content is preferably 0.03% or less.

Nb: 0.005% to 0.05%

Nb is an element that effectively strengthens weld metal. In particular, to achieve a tensile strength of 760 MPa or more, the Nb content needs to be 0.005% or more. However, when the Nb content is more than 0.05%, toughness is degraded. Accordingly, the upper limit of the Nb content is made 0.05%. The Nb content is preferably 0.005% to 0.04%, more preferably 0.005% to 0.03%.

Ti: 0.005% to 0.03%

Ti functions as a deoxidizing element in weld metal and effectively reduces the amount of oxygen in weld metal. To provide such an effect, the Ti content needs to be 0.005% or more. However, when the Ti content is more than 0.03%, excessive Ti forms a carbide and the toughness of weld metal is degraded. Accordingly, the upper limit of the Ti content is made 0.03%. The Ti content is preferably 0.005% to 0.02%.

N: 0.010% or less

Reduction of the amount of N forming a solid solution in weld metal also enhances toughness. In particular, when the N content is made 0.010% or less, toughness is considerably enhanced. Accordingly, the upper limit of the N content is made 0.010%. The N content is preferably 0.008% or less.

O: 0.015% to 0.045%

Reduction of the oxygen content in weld metal enhances toughness. In particular, when the O content is made 0.045% or less, toughness is considerably enhanced. Accordingly, the upper limit of the O content is made 0.045%. However, when the oxygen content in weld metal is made less than 0.015%, the amount of an oxide that is effective for reduction of the size of the structure of weld metal decreases and the toughness of weld metal is degraded. Accordingly, the lower limit of the O content is made 0.015%. The O content is preferably 0.015% to 0.035%.

B: 0.0003% to 0.0050%

In a welded pipe that is used as a line pipe and has a strength grade of 760 MPa or more and 930 MPa or less, addition of B is effective to make the microstructure of weld metal be a fine structure mainly constituted by bainite. To provide such an effect, B needs to be added in a content of 0.0003% or more and 0.0050% or less, preferably in the range of 0.0005% to 0.0050%, more preferably in the range of 0.0005% to 0.0030% or less, still more preferably 0.0007% to 0.0020%.

One or more of Cu, Ni, Cr, Mo, and V

When one or more of Cu, Ni, Cr, Mo, and V are added, Cu: 0.01% to 1.0%, Ni: 0.01% to 2.5%, Cr: 0.01% to 1.0%, and Mo: 0.01% to 1.5% are satisfied.

Cu, Ni, Cr, and Mo enhance hardenability in weld metal as in base material and hence one or more thereof are contained in a content of 0.01% or more for providing a bainite structure. However, when such a content is made high, the amount of alloy elements added to a welding wire becomes large and the strength of the wire considerably increases. As a result, feeding of the wire in submerged arc welding is not appropriately achieved. Accordingly, the upper limits of the contents of Cu, Ni, Cr, and Mo are respectively made 1.0%, 2.5%, 1.0%, and 1.5%; and the contents preferably satisfy. Cu: 0.01% to 0.5%, Ni: 0.01% to 2.3%, Cr: 0.01% or more and less than 0.5%, and Mo: 0.01% to 1.2%. The Ni content and the Mo content are more preferably Ni: 0.01% to 2.0% and Mo: 0.01% to 1.0%, still more preferably Ni: 0.5% to 2.0% and Mo: 0.1% to 1.0%.

V: 0.1% or less

Addition of an appropriate amount of V enhances strength without degrading toughness and weldability and hence V is an effective element. To provide such an effect, the V content is preferably 0.01% or more. However, when the V content is more than 0.1%, the toughness of a reheated zone of weld metal is considerably degraded. Accordingly, the upper limit of the V content is made 0.1%. The V content is preferably 0.05% or less.

The basic composition of the weld metal portion of our steel pipe has been described so far. To further enhance the toughness of the weld metal portion, one or more of Ca, REM, Zr, and Mg may be added.

Ca, REM, Zr, and Mg

Ca, REM, Zr, and Mg form an oxysulphide or a carbonitride in steel and suppress coarsening of austenite grains in a weld metal portion by the pinning effect. Ca, REM, Zr, and Mg may be added to enhance the toughness.

Ca: 0.0005% to 0.01%

In a steel production process, when Ca is added in a content of less than 0.0005%, a deoxidizing reaction predominantly occurs and it is difficult to provide a sufficiently large amount of CaS. Thus, the effect of enhancing the toughness is not provided. Accordingly, when Ca is added, the lower limit of the Ca content is made 0.0005%.

When Ca is added in a content of more than 0.01%, coarse CaO tends to be generated and the toughness is degraded. Accordingly, the upper limit of the Ca content is made 0.01%. When Ca is added, the Ca content is made 0.0005% to 0.01%, preferably 0.001% to 0.005%.

REM: 0.0005% to 0.02%

REM forms an oxysulphide in steel. Addition of REM in a content of 0.0005% or more provides the pinning effect of suppressing coarsening of austenite grains in a weld metal portion. However, REM is an expensive element and the effect is saturated in addition thereof in a content of more than 0.02%. Accordingly, the upper limit of the REM content is made 0.02%. When REM is added, the REM content is made 0.0005% to 0.02%, preferably 0.001% to 0.01%.

Zr: 0.0005% to 0.03%

Zr forms a carbonitride in steel and provides the pinning effect of suppressing coarsening of austenite grains in a weld metal portion. To sufficiently provide the pinning effect, Zr needs to be added in a content of 0.0005% or more. However, when Zr is added in a content of more than 0.03%, cleanliness in a weld metal portion is considerably degraded and the toughness is degraded. Accordingly, the upper limit of the Zr content is made 0.03%. When Zr is added, the Zr content is made 0.0005% to 0.03%, preferably 0.001% to 0.01%.

Mg: 0.0005% to 0.01%

Mg forms a fine oxide and provides the pinning effect of suppressing coarsening of austenite grains in a weld metal portion. To sufficiently provide the pinning effect, Mg needs to be added in a content of 0.0005% or more. However, when Mg is added in a content of more than 0.01%, cleanliness in weld metal is degraded and the toughness is degraded. Accordingly, the upper limit of the Mg content is made 0.01%. When Mg is added, the Mg content is made 0.0005% to 0.01%, preferably 0.001% to 0.005%.

Microstructure of the Base Material

The microstructure of base material is preferably defined to achieve excellent buckling resistance. In a Charpy impact test at −40° C., a target absorbed energy of 210 J or more in a case where a plate thickness is less than 25 mm and 150 J or more in a case where the plate thickness is 25 mm or more; and excellent strain ageing resistance. By defining the microstructure of base material, in a DWTT at −20° C., a ductile fracture surface area ratio of 85% or more, which is a target, can also be achieved.

To obtain a steel pipe having buckling resistance, base material is made to have tensile characteristics of an S-S curve that is of a round house type and has a high work hardening coefficient (n value). There is an index equivalent to the n value: a yield ratio (0.5% yield strength/tensile strength). To achieve a low yield ratio of 85% or less, a two-phase structure constituted by a soft phase and a hard phase is formed.

Bainite is used as the soft phase and island martensite is used as the hard phase. To achieve the above-described yield ratio, the area fraction of island martensite is preferably 4% or more. Note that bainite in the microstructure of base material denotes, in a narrow sense, bainitic ferrite.

When island martensite has a long axis size of more than 2 μm, it becomes difficult to achieve a ductile fracture surface area ratio of 85% or more in a DWTT (test temperature: −20° C.). When island martensite has a long axis size of more than 2 μM and bainitic ferrite surrounded by boundaries having a misorientation of 15° or more has a long axis size of more than 20 it becomes difficult to achieve a charpy absorbed energy of 210 J or more at −40° C. in a case where a plate thickness is less than 25 mm and a charpy absorbed energy of 150 J or more at −40° C. in a case where the plate thickness is 25 mm or more.

When the area fraction of island martensite is more than 12%, it becomes difficult to achieve the above-described toughness of base material due to the fine size of the microstructure. Note that, when the area fraction of island martensite is in the range of 4% to 12%, a yield ratio of 85% or less can be achieved. Herein, "the area fraction of island martensite is in the range of 4% to 12%" denotes that the area fraction of island martensite relative to the entire microstructure including bainite, island martensite, and the remaining structure within an allowable range as described below, is in the range of 4% to 12%.

By making the microstructure of a base steel plate be mainly constituted by a bainite structure containing island martensite having an area fraction of 4% or more and 12% or less, excellent strain ageing resistance can be achieved as described below.

This is because, in a production process described below, C is concentrated in an untransformed austenite phase through bainite transformation occurring in accelerated cooling and subsequent reheating. The untransformed austenite phase in which C is concentrated is turned into island martensite. Hence, the amount of C forming a solid solution in a bainite phase becomes small, compared with steels produced by existing techniques.

As a result, even when a steel pipe is subjected to a thermal history at 250° C. for 30 minutes, which is at a high temperature and for a long period for a normal coating step for steel pipes, an increase in yield stress (YS) due to strain ageing, an increase in a yield ratio and a decrease in uniform elongation due to the increase in YS can be suppressed. Accordingly, even when our steel is subjected to a thermal history with which characteristics of existing steels are degraded due to strain ageing, it can maintain a uniform elongation of 5% or more and a yield ratio of 85% or less.

Accordingly, it is defined that the microstructure of a base steel plate is mainly constituted by a bainite structure containing island martensite having an area fraction of 4% or more and 12% or less, the island martensite contained has a long axis size of 2 μm or less, and bainitic ferrite surrounded by boundaries having a misorientation of 15° or more has a long axis size of 20 μm or less.

Note that "mainly constituted by a bainite structure containing island martensite" means that 95% or more of the entirety is constituted by this structure and the balance may contain pearlite or martensite. The area fraction of island martensite is determined by random observation of ten or more fields of view at positions in the middle of a plate thickness with an electron scanning microscope (magnification ratio: 2000).

Microstructure of Welded Heat Affected Zone

Due to an increase in the strength of steel pipes, existing welding heat input tends to result in the formation of upper bainite containing coarse island martensite as the microstructure of a welded heat affected zone, and low-temperature toughness becomes poor. Accordingly, the upper bainite containing coarse island martensite needs to be reduced so as to have a specific area fraction or less.

It is known that a lower bainite structure in which fine cementite precipitates in lath has excellent toughness while maintaining a high strength. By enhancing hardenability, the lower bainite structure is provided. Hardenability can be enhanced by a method of adding a component such as B or a method of increasing a cooling rate within the γ-α transformation range in a welded heat affected zone by decreasing welding heat input.

In toughness evaluation tests represented by a Charpy test, in particular, in a test in terms of a welded heat affected zone, the welded heat affected zone has heat affected zone structures having been heated to various maximum temperatures and a composite structure of weld metal and the like at the bottom of a notch, and not only the material of the heat affected zone structures but also the structure size of the heat affected zone influence the test. Thus, variation in toughness tends to be caused.

Accordingly, to achieve excellent low-temperature toughness with stability, the fraction of the local brittle zone (LBZ) needs to be reduced to a specific fraction or less. In particular, to achieve a cumulative failure probability of 1% or less in a joint HAZ Charpy test performed 100 or more times at a test temperature of −30° C., it is important that, in a welded heat affected zone in which a prior austenite grain size is 50 μm or more near a fusion line, the area fraction of an upper bainite structure containing coarse island martensite is reduced to 50% or less and a lower bainite structure having an area fraction of 50% or more is provided.

Production Conditions of Base Steel Plate

A base steel plate is produced by subjecting a steel having the above-described composition to hot rolling such that the steel is heated at a temperature of 1000° C. to 1300° C., a cumulative rolling reduction at more than 950° C. is 10% or more, a cumulative rolling reduction at 750° C. or less is 75% or more, and a finish rolling temperature is 650° C. or more; then subjecting the steel to accelerated cooling to a temperature of 450° C. or more and less than 650° C. at a cooling rate of 10° C./s or more; and, immediately after the accelerated cooling, reheating the steel to a temperature of 500° C. to 750° C. at a heating rate of 0.5° C./s or more, the temperature being equal to or more than a stopping temperature of the accelerated cooling.

The reasons for which the limitations are made in the method for producing a steel plate will be described.

Note that the temperatures such as the heating temperature, the finish rolling temperature, the cooling stopping temperature, and the reheating temperature are average temperatures of a steel plate. Such an average temperature is calculated from the surface temperature of a slab or a steel plate in consideration of parameters such as a plate thickness and thermal conductivity. The cooling rate is an average cooling rate obtained by dividing a temperature difference for cooling between the finish hot-rolling temperature and the cooling stopping temperature (450° C. to less than 650° C.) by the time for which the cooling is performed.

The heating rate is an average heating rate obtained by dividing a temperature difference for reheating between the cooling stopping temperature and the reheating temperature (500° C. to 750° C.) by the time for which the reheating is performed. Hereinafter, production conditions will be described in detail.

Heating Temperature: 1000° C. to 1300° C.

In performing hot rolling, the lower limit of a temperature at which complete formation of austenite occurs is 1000° C. When a steel slab is heated to a temperature more than 1300°

C., austenite grains considerably grow in spite of TiN pinning and the toughness of the base material is degraded. Accordingly, the upper limit is made 1300° C. The temperature is preferably 1000° C. to 1150° C.

Cumulative Rolling Reduction at More than 950° C.: 10% or More

By performing rolling in the austenite recrystallization region, duplex-grain formation due to generation of coarse austenite grains or the like is suppressed. Such an effect is not provided with a cumulative rolling reduction of less than 10% and hence the cumulative rolling reduction at more than 950° C. is made 10% or more.

Cumulative Rolling Reduction at More than 750° C. and 950° C. or Less: 20% or More By performing rolling in a relatively high temperature region in the austenite non-recrystallization region, duplex-grain formation due to generation of coarse austenite grains or the like is suppressed. Such an effect is not sufficiently provided with a cumulative rolling reduction of less than 20% at more than 750° C. and 950° C. or less corresponding to this temperature region and hence the cumulative rolling reduction at more than 750° C. and 950° C. or less is preferably made 20% or more.

Cumulative Rolling Reduction at 750° C. or Less: 75% or More

By performing rolling with a high cumulative rolling reduction in this relatively low temperature region in the austenite non-recrystallization region, austenite grains are elongated; the size of bainitic ferrite and island martensite generated through transformation in the subsequent accelerated cooling is reduced finely; and toughness is considerably enhanced.

To achieve a low yield ratio, island martensite is dispersed in the second phase. Accordingly, the size reduction of bainite needs to be promoted particularly with a rolling reduction of 75% or more to thereby suppress degradation of toughness. Therefore, the cumulative rolling reduction at 750° C. or less is made 75% or more; preferably, it is 80% or more.

Note that rolling is performed with a high cumulative rolling reduction in the relatively low temperature region in the austenite non-recrystallization region. As described above, since our steel contains B, generation of polygonal ferrite is suppressed. That is, the austenite non-recrystallization region extends to a low temperature region, compared with steels containing no B. Accordingly, in spite of the simple reference "rolling in the austenite non-recrystallization region", rolling in the austenite non-recrystallization region can be performed in a low temperature region, compared with existing steels. Accordingly, an effect of enhancing toughness through the size reduction of the structure can be considerably provided.

Finish Rolling Temperature: 650° C. or More

When the finish hot-rolling temperature is less than 650° C., pro-eutectoid ferrite is generated from austenite grain boundaries in the subsequent air-cooling step, which causes a decrease in the strength of the base material. Accordingly, to suppress generation pro-eutectoid ferrite, the lower limit of the temperature is made 650° C. The temperature is preferably 650° C. to 700° C.

Cooling Rate in Accelerated Cooling: 10° C./s or More

To achieve a high strength that is a tensile strength of 760 MPa or more, the microstructure needs to be mainly constituted by bainite. To achieve this, accelerated cooling is performed after hot rolling. When the cooling rate is less than 10° C./s, bainite transformation starts at a relatively high temperature and hence a sufficiently high strength is not achieved. Accordingly, a cooling rate in accelerated cooling is made 10° C./s or more; preferably, it is 12° C./s to 50° C./s.

Cooling Stopping Temperature of Accelerated Cooling: 450° C. to Less than 650° C.

This process is an important production condition. Accelerated cooling is finished in a temperature region in which bainite transformation is proceeding, that is, untransformed austenite is present. After that, reheating is immediately performed and transformation from untransformed austenite to bainite occurs. In bainitic ferrite in such bainite generated at a relatively high temperature, the amount of C forming a solid solution in bainitic ferrite is small and hence C is ejected to surrounding untransformed austenite. Thus, as bainite transformation proceeds in reheating, the amount of C in untransformed austenite increases. At this time, when an austenite stabilization element such as Mn or Si is contained in a specific amount or more, untransformed austenite in which C is concentrated remains even at the time when the reheating is finished. The untransformed austenite transforms into MA in a cooling step (air cooling) after the reheating. Thus, the structure of base material is finally made to be a bainite structure containing island martensite.

Specifically, accelerated cooling needs to be stopped in a temperature region in which bainite transformation is proceeding and untransformed austenite is present. When the cooling stopping temperature is less than 450° C., it is difficult to sufficiently provide untransformed austenite and island martensite is not sufficiently provided in air cooling performed after reheating. Accordingly, a low yield ratio of 85% or less is not achieved.

When the cooling stopping temperature is 650° C. or more, pearlite precipitating during cooling consumes C and island martensite is not generated. Accordingly, the upper limit of the temperature is made less than 650° C. In view of a balance between strength and toughness, the temperature is preferably 500° C. to 550° C.

Heating Rate in Reheating after Cooling is Stopped: 0.5° C./s or More

By performing reheating, immediately after accelerated cooling, C is concentrated in untransformed austenite and island martensite can be generated during the subsequent air-cooling step. Note that "performing reheating immediately after accelerated cooling" denotes starting reheating at a heating rate of 0.5° C./s or more within 3 minutes from the stopping of accelerated cooling.

When the heating rate is less than 0.5° C./s, cementite in bainite coarsens and the toughness of base material is degraded. Accordingly, the heating rate is made 0.5° C./s or more; preferably, it is 1.0° C./s to 10° C./s.

Reheating Temperature after Cooling is Stopped: 500° C. To 750° C.

When the reheating temperature is less than 500° C. concentration of C into austenite does not sufficiently occur and a necessary area fraction of island martensite cannot be achieved.

When the reheating temperature is more than 750° C., bainite generated through transformation in accelerated cooling turns back to austenite and a sufficiently high strength is not achieved. Accordingly, the reheating temperature is defined as 750° C. or less; preferably, it is 700° C. or less; more preferably, in view of a balance between strength and toughness, it is 580° C. to 680° C. As for the reheating temperature, it is not particularly necessary to set temperature holding time.

Island martensite is generated regardless of a cooling rate during cooling after reheating. Accordingly, cooling after reheating is preferably basically air cooling. When reheating after accelerated cooling is performed with a radio-frequency heating apparatus disposed together with an accelerated cooling apparatus on the same line (inline), heating can be performed immediately after accelerated cooling, which is preferable.

Note that, although a steel production method is not particularly limited, it is economically desirable to perform a steel production process by a steel converter method and casting of steel slabs by a continuous casting process.

The above-described production process in which the area fraction and grain size of island martensite are controlled can provide a steel plate having a tensile strength of 760 MPa or more and 930 MPa or less, a uniform elongation of 5% or more, high deformability in which a ratio of 0.5% proof strength to tensile strength is 85% or less, a ductile fracture surface area ratio of 85% or more in a DWTT at −20° C., and a high toughness in which a charpy absorbed energy at −40° C. is 210 J or more in a case where the plate thickness is less than 25 mm and a charpy absorbed energy at −40° C. is 150 J or more in a case where the plate thickness is 25 mm or more.

By controlling the microstructure of base material by the above-described production process, that is, by making the microstructure of base material be mainly constituted by a bainite structure containing island martensite having an area fraction of 4% or more and 12% or less, the resultant steel pipe can maintain a yield ratio of 85% or less even after being subjected to coating heating at about 250° C. Thus, excellent strain ageing resistance can be achieved that is not achieved by a production process finished with accelerated cooling.

Production Conditions of Steel Pipe

A high strength steel pipe that is for low-temperature usage and is excellent in terms of buckling resistance and toughness of a welded heat affected zone is produced by, in a standard manner, subjecting a base steel plate having the above-described tensile strength characteristics to forming into a pipe shape by U-press and O-press, and then to seam welding.

The seam welding is performed by performing tack welding and then subjecting an internal layer and an external layer to submerged arc welding. A flux used in the submerged arc welding is not particularly limited and may be a fused flux or a baked flux. If necessary, preheating before welding or a post weld heat treatment (abbreviation: PWHT) is performed.

The welding heat input (kJ/cm) of submerged arc welding is adjusted such that, in a base steel plate having a thickness of about 20 to 40 mm, the above-described composition, and a $P_{CM}$ of 0.19% to 0.25%, a heat input is 80 kJ/cm or less and the microstructure of a welded heat affected zone in which a prior austenite grain size is 50 μm or more near a fusion line is a lower bainite structure or a multi-phase structure containing lower bainite having an area fraction of 50% or more and upper bainite and/or martensite.

When such a structure is provided, the low-temperature toughness of a local brittle zone (LBZ) whose toughness is most degraded in a joint HAZ illustrated in FIG. 1 is effectively enhanced.

FIG. 1A illustrates a charpy specimen 1 having an external FL notch. FIG. 1B illustrates a charpy specimen 3 having a Root-FL notch. A local brittle zone 4 (LBZ) at the notch position denotes, in external welding, a coarse-grain HAZ 8 (CGHAZ) structure (in which a prior austenite grain size is 50 μm or more) near a bond 7; and denotes, in the Root zone in internal welding, a coarse-grain HAZ 11 (ICCGHAZ) structure generated by heating an internal coarse-grain HAZ 8 (CGHAZ) structure to a two-phase region (Ac1 to Ac3 points).

In particular, when a welding condition in which a heat input balance between external welding and internal welding satisfies a formula (3) below is employed, coarsening of γ grains in the internal coarse-grain HAZ (CGHAZ) can be suppressed and joint HAZ samples from an external fusion line (FL) position and a Root fusion line (FL) position can stably have a sufficiently high toughness.

Note that "stably have" means that a cumulative failure probability is 1% or less in a joint HAZ Charpy test performed 100 or more times at a test temperature of −30° C. or less.

$$\text{internal heat input} \leq \text{external heat input} \quad (3)$$

The lower bainite structure denotes a structure in which carbide mainly constituted by cementite precipitates in laths (having a width of 1 μm or less) of bainitic ferrite; and the upper bainite denotes a structure containing island martensite (MA) and/or cementite between laths. When a welded heat affected zone that is near a fusion line and obtained by external seam welding has the above-described microstructure, it has a hardness satisfying $250 \leq HV(98N) \leq 350$ and an excellent toughness in the welded heat affected zone is achieved in which a cumulative failure probability is 1% or less in a joint HAZ Charpy test performed 100 or more times at a test temperature of −30° C.

After seam welding, pipe expansion is performed at an expansion ratio of 0.4% or more and 2.0% or less in accordance with a roundness required. When the expansion ratio is less than 0.4%, particularly in the case of a large plate thickness of 20 mm or more, it is difficult to achieve a roundness normally required. When the expansion ratio is more than 2.0%, strain is excessively concentrated to a bond that is a boundary between weld metal and a welded heat affected zone and cracking may be caused by pipe expansion. In addition, excessive strain introduction may degrade joint characteristics. In view of enhancing roundness, joint strength, and toughness, the expansion ratio is preferably 0.5% to 1.5%. The microstructure of a coarse-grain HAZ (CGHAZ) in a welded heat affected zone in which a prior austenite grain size is 50 μm or more near a fusion line is identified by random observation of ten or more fields of view at positions that are 6 mm away from the external surface with an electron scanning microscope (magnification ratio: 5000).

EXAMPLES

Example 1

Steels having various chemical compositions in Table 1 were refined with a steel converter and turned into cast slabs having a thickness of 170 to 250 mm by continuous cast. The cast slabs were then turned into steel plates 1 to 10 under conditions of hot rolling, accelerated cooling, and reheating in Table 2. The reheating was performed with an induction heating apparatus disposed together with accelerated cooling equipment on the same line.

The steel plates were formed by U-press and O-press and subsequently subjected to internal seam welding then to external seam welding by submerged arc welding. After that, pipe expansion was performed at an expansion ratio of 0.6% to 1.2% to provide steel pipes having an outer diameter of 400 to 1626 mm. Tables 3-1 and 3-2 show the chemical compositions of weld metal portions 6 and 5 for internal seam welding and external seam welding in the steel pipes 1-1 to 10.

To evaluate the joint strength of the obtained steel pipes, tensile tests were performed with through-thickness tensile specimens in compliance with API-5L that were sampled in the pipe axial direction in terms of base material portions and in the pipe circumferential direction in terms of seam weld portions.

Charpy impact tests were performed at a test temperature of −30° C. with V-notch charpy impact specimens 1 and 3 according to JIS Z2202 (1980) that were sampled from weld joint portions of the steel pipes at two positions of the external FL position and the Root-FL position illustrated in FIGS. 1-A and 1-B. Note that a notch position 2 was a position where HAZ and weld metal were present with a ratio of 1:1.

As for the microstructure of CGHAZ, a coarse-grain HAZ (CGHAZ) by external seam welding was observed at positions that were 6 mm away from the surface with an electron scanning microscope (magnification ratio: 5000). The test results of the hardness of coarse-grain HAL (CGHAZ) and the toughness of coarse-grain HAZ (CGHAZ) (hereafter, referred to as HAZ toughness) are summarized in Tables 4-1 and 4-2.

Charpy impact tests were performed at a test temperature of −40° C. with V-notch charpy impact specimens according to JIS Z2202 (1980) that were sampled from positions in the middle of the plate thickness of base material portions of the steel pipes. In addition, tests were performed at a test temperature of −20° C. with DWTT specimens in compliance with API-5L that were sampled from the steel pipes to thereby determine SA values (shear area, ductile fracture surface area ratio).

Target conditions are defined as follows: in a base steel plate, a tensile strength is 760 MPa or more and 930 MPa or less, a uniform elongation is 5% or more, and a ratio of 0.5% proof strength to tensile strength is 85% or less; in the base material, a charpy absorbed energy at a test temperature of −40° C. is 210 J or more in a case where the plate thickness is less than 25 mm and is 150 J or more in a case where the plate thickness is 25 mm or more, and DWTTSA-20° C. is 85% or more; the seam weld joint strength of a steel pipe is 760 MPa or more and 930 MPa or less; and, in the above-described coarse-grain HAZ (CGHAZ), a charpy absorbed energy at a test temperature of −30° C. is 100 J or more.

Tables 4-1 and 4-2 show the test results. Test Nos. 1, 2, and 3 are inventive examples: each base material portion had desired strength, yield ratio, uniform elongation, and toughness; each seam weld portion had high HAZ toughness; the microstructure of the base material portion was mainly constituted by a bainite structure containing island martensite having an area fraction of 4% or more and 12% or less, the island martensite contained had a long axis size of 2 μm or less, and bainitic ferrite surrounded by boundaries having a misorientation of 15° or more had a long axis size of 20 μm or less.

In addition, the microstructure of a coarse-grain HAZ (CGHAZ) was a multi-phase structure containing lower bainite having an area fraction of 50% or more, the balance being upper bainite and/or martensite.

In contrast, as for test Nos. 4, 5, and 6, the base material compositions were adequate, but the cumulative rolling reduction at 750° C. or less in the rolling of steel plates was less than 75% (refer to Table 2) and, as a result, the toughness of the base materials was poor. The microstructures of the weld portions satisfied the definitions and had good toughness.

As for test Nos. 7, 8, and 9, the base material compositions were in our range, but the welding heat input was high. Thus, in the microstructures of the coarse-grain HAZ (CGHAZ) of the joints, the fraction of lower bainite was below the lower limit of the definition and the fraction of an upper bainite structure was high. Accordingly, HAZ toughness was poor in the external and internal Root zones.

As for test No. 10, B was not added and the fraction of an upper bainite structure was high. Accordingly, HAZ toughness was poor in the external and internal Root zones.

As for test No. 11, the $P_{CM}$ was below our lower limit and the base material and the joint had a tensile strength of less than 760 MPa. In addition, in the microstructure of the coarse-grain HAZ (CGHAZ) of the joint, the fraction of lower bainite was low and the coarse-grain HAZ (CGHAZ) structure was an upper bainite structure. Accordingly, HAZ toughness was poor in the external and internal Root zones.

As for test No. 12, the $P_{CM}$ value was beyond our upper limit and the coarse-grain HAZ (CGHAZ) structure was a martensite structure. Accordingly, HAZ toughness was poor in the external and internal Root zones.

As for test No. 13, although internal welding heat input and external welding heat input were 80 kJ/cm or less, the internal welding heat input was higher than the external welding heat input. Thus, the microstructure of the Root zone in which austenite grain size was large was subjected to rapid cooling and hence a coarse upper bainite structure was formed. Accordingly, Root HAZ toughness was poor.

Example 2

Steels having various chemical compositions in Table 5 were refined with a steel converter and turned into cast slabs having a thickness of 160 to 250 mm by continuous cast. The cast slabs were then turned into steel plates 11 to 24 under conditions of hot rolling, accelerated cooling, and reheating in Table 6. The reheating was performed with an induction heating apparatus disposed together with accelerated cooling equipment on the same line.

The steel plates were formed by U-press and O-press and subsequently subjected to internal seam welding then to external seam welding by submerged arc welding. After that, pipe expansion was performed at an expansion ratio of 0.6% to 1.2% to provide steel pipes having an outer diameter of 400 to 1626 mm. Tables 7-1 and 7-2 show the chemical compositions of weld metal portions for internal seam welding and external seam welding of the steel pipes 11-1 to 24.

To evaluate the joint strength of the obtained steel pipes, tensile tests were performed with through-thickness tensile specimens in compliance with API-5L that were sampled in the pipe axial direction in terms of base material portions and in the pipe circumferential direction in terms of seam weld portions.

Charpy impact tests were performed at a test temperature of −30° C. with V-notch charpy impact specimens 1 and 3 according to JIS Z2202 (1980) that were sampled from weld joint portions of the steel pipes at two positions of the external FL position and the Root-FL position illustrated in FIGS. 1-A and 1-B. Note that a notch position 2 was a position where HAZ and weld metal were present with a ratio of 1:1.

As for the microstructure of CGHAZ, a coarse-grain HAZ (CGHAZ) by external seam welding was observed at positions that are 6 mm away from the surface with an electron scanning microscope (magnification ratio: 5000). The test results of the hardness of coarse-grain HAZ (CGHAZ) and the toughness of coarse-grain HAZ (CGHAZ) (hereafter, referred to as HAZ toughness) are summarized in Tables 8-1 and 8-3.

Charpy impact tests were performed at a test temperature of −40° C. with V-notch charpy impact specimens according to JIS Z2202 (1980) that were sampled from positions in the middle of the plate thickness of base material portions of the steel pipes. In addition, tests were performed at a test temperature of −20° C. with DWTT specimens in compliance with API-5L that were sampled from the steel pipes to thereby determine SA values (shear area, ductile fracture surface area ratio).

Our target conditions are defined as follows: in a base steel plate, a tensile strength is 760 MPa or more and 930 MPa or less, a uniform elongation is 5% or more, and a ratio of 0.5% proof strength to tensile strength is 85% or less; in the base material, a charpy absorbed energy at a test temperature of −40° C. is 210 J or more in a case where the plate thickness is less than 25 mm and is 150 J or more in a case where the plate thickness is 25 mm or more, and DWTTSA-20° C. is 85% or more; the seam weld joint strength of a steel pipe is 760 MPa or more and 930 MPa or less; and, in the above-described coarse-grain HAZ (CGHAZ), a charpy absorbed energy at a test temperature of −30° C. is 100J or more.

The produced steel plates were subjected to a strain ageing treatment by being held at 250° C. for 30 minutes. After that, evaluation was similarly performed by subjecting the base materials to tensile tests and Charpy tests and subjecting the welded heat affected zones (HAZ) to Charpy tests. The evaluation criteria used after the strain ageing treatment were the same as the above-described evaluation criteria used before the strain ageing treatment.

Tables 8-1, 8-2, 8-3, and 8-4 show the test results. Test Nos. 14, 15, 16, 17 and 18 are inventive examples in which base materials and weld portions satisfied our definitions: each base material portion had desired strength, yield ratio, uniform elongation, and toughness; each seam weld portion had high HAZ toughness; the microstructure of the base material portion was mainly constituted by a bainite structure containing island martensite having an area fraction of 4% or more and 12% or less, the island martensite contained had a long axis size of 2 μm or less, and bainitic ferrite surrounded by boundaries having a misorientation of 15° or more had a long axis size of 20 μm or less.

In addition, the microstructure of a coarse-grain HAZ (CG-HAZ) was a multi-phase structure containing lower bainite having an area fraction of 50% or more, the balance being upper bainite and/or martensite.

In contrast, as for test Nos. 19, 20, 21 and 22, the base material compositions were adequate, but the cumulative rolling reduction at 750° C. or less in the rolling of steel plates was less than 75% (refer to Table 6) and, as a result, the toughness of the base materials was poor. The microstructures of the weld portions satisfied our definitions and had good toughness.

As for test Nos. 23, 24, 25, and 26, the base material compositions were in our range, but the welding heat input was high. Thus, in the microstructures of the coarse-grain HAZ (CGHAZ) of the joints, the fraction of lower bainite was below the lower limit of our definition and the fraction of an upper bainite structure was high. Accordingly, HAZ toughness was poor in the external and internal Root zones.

As for test No. 27, B was not added and the fraction of an upper bainite structure was high. Accordingly, HAZ toughness was poor in the external and internal Root zones.

As for test No. 28, the $P_{CM}$ was below our lower limit and the base material and the joint had a tensile strength of less than 760 MPa. In addition, in the microstructure of the coarse-grain HAZ (CGHAZ) of the joint, the fraction of lower bainite was low and the coarse-grain HAZ (CGHAZ) structure was an upper bainite structure. Accordingly, HAZ toughness was poor in the external and internal Root zones.

As for test No. 29, the $P_{CM}$ value was beyond our upper limit and the coarse-grain HAZ (CGHAZ) structure was a martensite structure. Accordingly, HAZ toughness was poor in the external and internal Root zones. In addition, the toughness of the base material was poor.

As for test No. 30, although internal welding heat input and external welding heat input were 80 kJ/cm or less, the internal welding heat input was higher than the external welding heat input. Thus, the microstructure in the Root zone in which austenite grain size was large was subjected to rapid cooling and hence a coarse upper bainite structure was formed. Accordingly, Root HAZ toughness was poor.

Note that, even after the inventive examples of test Nos. 14 to 18 were subjected to the strain ageing treatment of being held at 250° C. for 30 minutes, they had excellent test results equivalent to those before the strain ageing, in terms of tensile tests and Charpy tests of base materials, Charpy tests of welded heat affected zones (HAZ), and the like. In contrast, in the comparative example of test No. 31, the cooling stopping temperature in the steel plate production was too low and hence the MA fraction required was not achieved. Accordingly, test No. 31 did not satisfy the evaluation criterion in terms of yield ratio of steel-pipe base material before and after the strain ageing treatment of holding at 250° C. for 30 minutes.

TABLE 1

(mass %)

| Steel type | C | Si | Mn | P | S | Mo | Ti | Nb | V | Al | Cu | Ni | Cr |
|---|---|---|---|---|---|---|---|---|---|---|---|---|---|
| A | 0.06 | 0.12 | 1.91 | 0.004 | 0.001 | 0.10 | 0.012 | 0.010 | — | 0.03 | 0.20 | 0.22 | 0.21 |
| B | 0.06 | 0.20 | 1.94 | 0.007 | 0.002 | 0.22 | 0.012 | 0.025 | — | 0.04 | 0.40 | — | — |
| C | 0.06 | 0.02 | 1.78 | 0.002 | 0.001 | 0.31 | 0.012 | 0.022 | — | 0.03 | 0.20 | 0.70 | 0.20 |
| D* | 0.06 | 0.10 | 1.90 | 0.007 | 0.001 | 0.20 | 0.011 | 0.024 | — | 0.04 | 0.31 | 0.15 | 0.20 |
| E* | 0.05 | 0.15 | 1.50 | 0.006 | 0.001 | 0.12 | 0.012 | 0.018 | 0.042 | 0.04 | 0.02 | 0.05 | — |
| F* | 0.06 | 0.25 | 1.90 | 0.006 | 0.001 | 0.44 | 0.012 | 0.018 | 0.042 | 0.04 | 0.35 | 0.75 | 0.45 |
| G* | 0.06 | 0.02 | 1.78 | 0.002 | 0.001 | 0.33 | 0.012 | 0.031* | — | 0.03 | 0.20 | 0.70 | 0.20 |

| Steel type | Ca | REM | Zr | Mg | B | N | O | $P_{CM}$ (%) |
|---|---|---|---|---|---|---|---|---|
| A | — | — | — | — | 0.0007 | 0.004 | 0.002 | 0.19 |
| B | 0.002 | 0.001 | — | — | 0.0010 | 0.003 | 0.002 | 0.20 |
| C | 0.001 | — | — | — | 0.0008 | 0.004 | 0.002 | 0.21 |
| D* | 0.002 | — | — | — | —* | 0.004 | 0.002 | 0.20 |

TABLE 1-continued

|  |  |  |  |  |  |  |  | (mass %) |
|---|---|---|---|---|---|---|---|---|
| E* | 0.002 | — | — | — | 0.0008 | 0.004 | 0.003 | 0.15* |
| F* | 0.002 | — | — | — | 0.0012 | 0.004 | 0.003 | 0.26* |
| G* | 0.001 | — | — | — | 0.0008 | 0.004 | 0.002 | 0.21 |

Note 1:
*indicates out of the scope of the present invention.
Note 2:
$P_{CM} = C + Si/30 + Mn/20 + Cu/20 + Ni/60 + Cr/20 + Mo/15 + V/10 + 5*B$ (each element symbol represents content (mass %).)

TABLE 2

| Steel plate | Steel type | Heating temperature (° C.) | Cumulative rolling reduction at more than 950° C. (%) | Cumulative rolling reduction of 950-750° C. (%) | Cumulative rolling reduction at 750° C. or less (%) | Finish rolling temperature (° C.) | Cooling rate (° C./S) | Cooling stopping temperature (° C.) | Reheating rate (° C./S) | Reheating temperature (° C.) | plate thickness (mm) |
|---|---|---|---|---|---|---|---|---|---|---|---|
| 1 | A | 1120 | 15 | 20 | 80 | 720 | 24 | 500 | 6 | 650 | 26 |
| 2 | B | 1150 | 20 | 25 | 75 | 710 | 28 | 580 | 12 | 640 | 28 |
| 3 | C | 1050 | 16 | 20 | 75 | 710 | 27 | 540 | 3 | 650 | 36 |
| 4 | A | 1100 | 45 | 45 | 50* | 720 | 30 | 500 | 2 | 630 | 26 |
| 5 | B | 1080 | 50 | 20 | 60* | 720 | 22 | 510 | 3 | 650 | 28 |
| 6 | C | 1050 | 15 | 22 | 70* | 710 | 26 | 520 | 6 | 640 | 36 |
| 7 | D* | 1120 | 15 | 25 | 75 | 720 | 32 | 560 | 10 | 650 | 26 |
| 8 | E* | 1050 | 10 | 20 | 80 | 700 | 30 | 550 | 5 | 650 | 36 |
| 9 | F* | 1040 | 15 | 22 | 77 | 720 | 24 | 520 | 1 | 650 | 28 |
| 10 | G* | 1100 | 20 | 25 | 75 | 710 | 27 | 550 | 3 | 650 | 32 |

Note:
*indicates out of the scope of the present invention.

TABLE 3-1

|  |  |  |  |  |  |  |  |  |  |  |  |  |  |  |  | (mass %) |
|---|---|---|---|---|---|---|---|---|---|---|---|---|---|---|---|---|
| Steel pipe | Steel plate | Steel type |  | C | Si | Mn | P | S | Mo | Ti | Nb | V | Al | Cu | Ni | Cr |
| 1-1 | 1 | A | Internal | 0.08 | 0.10 | 1.90 | 0.007 | 0.003 | 0.4 | 0.014 | 0.04 | 0.03 | 0.02 | 0.34 | 0.50 | 0.28 |
|  |  |  | External | 0.07 | 0.23 | 1.92 | 0.006 | 0.003 | 0.5 | 0.016 | 0.03 | 0.04 | 0.03 | 0.43 | 0.44 | 0.24 |
| 2-1 | 2 | B | Internal | 0.06 | 0.23 | 1.98 | 0.010 | 0.003 | 0.2 | 0.011 | 0.04 | 0.06 | 0.04 | 0.31 | 0.45 | 0.50 |
|  |  |  | External | 0.08 | 0.24 | 1.92 | 0.008 | 0.003 | 0.3 | 0.020 | 0.01 | — | 0.04 | 0.15 | 0.65 | 0.40 |
| 3-1 | 3 | C | Internal | 0.09 | 0.23 | 2.20 | 0.006 | 0.003 | 0.3 | 0.019 | 0.04 | 0.02 | 0.02 | 0.40 | 0.64 | 0.12 |
|  |  |  | External | 0.08 | 0.25 | 2.35 | 0.006 | 0.003 | 0.4 | 0.022 | 0.05 | 0.02 | 0.02 | 0.55 | 0.35 | 0.13 |
| 4 | 4 | A | Internal | 0.06 | 0.22 | 1.97 | 0.009 | 0.003 | 0.3 | 0.014 | 0.03 | 0.04 | 0.04 | 0.24 | 0.47 | 0.42 |
|  |  |  | External | 0.07 | 0.22 | 1.92 | 0.008 | 0.002 | 0.3 | 0.018 | 0.02 | — | 0.03 | 0.17 | 0.64 | 0.32 |
| 5 | 5 | B | Internal | 0.07 | 0.16 | 1.92 | 0.007 | 0.003 | 0.4 | 0.014 | 0.04 | 0.03 | 0.03 | 0.32 | 0.48 | 0.26 |
|  |  |  | External | 0.07 | 0.21 | 1.94 | 0.006 | 0.002 | 0.4 | 0.015 | 0.03 | 0.04 | 0.03 | 0.47 | 0.45 | 0.24 |
| 6 | 6 | C | Internal | 0.07 | 0.24 | 1.82 | 0.008 | 0.003 | 0.1 | 0.020 | 0.02 | 0.01 | 0.04 | 0.15 | 0.25 | 0.40 |
|  |  |  | External | 0.08 | 0.23 | 1.75 | 0.006 | 0.003 | 0.2 | 0.022 | 0.04 | 0.01 | 0.02 | 0.23 | 0.20 | 0.35 |
| 1-2 | 1 | A | Internal | 0.07 | 0.10 | 1.90 | 0.007 | 0.003 | 0.2 | 0.014 | 0.04 | 0.03 | 0.02 | 0.54 | 0.80 | 0.30 |
|  |  |  | External | 0.08 | 0.23 | 1.92 | 0.006 | 0.003 | 0.2 | 0.016 | 0.03 | 0.04 | 0.03 | 0.33 | 0.74 | 0.22 |
| 2-2 | 2 | B | Internal | 0.07 | 0.19 | 1.91 | 0.007 | 0.003 | 0.3 | 0.015 | 0.02 | 0.04 | 0.03 | 0.26 | 0.47 | 0.38 |
|  |  |  | External | 0.07 | 0.23 | 1.92 | 0.006 | 0.002 | 0.3 | 0.016 | 0.02 | 0.01 | 0.03 | 0.22 | 0.55 | 0.38 |
| 3-2 | 3 | C | Internal | 0.08 | 0.23 | 2.12 | 0.006 | 0.003 | 0.3 | 0.020 | 0.04 | 0.02 | 0.02 | 0.65 | 0.95 | 0.10 |
|  |  |  | External | 0.07 | 0.19 | 2.31 | 0.006 | 0.003 | 0.3 | 0.023 | 0.04 | 0.03 | 0.04 | 0.55 | 1.20 | 0.12 |
| 7 | 7 | D* | Internal | 0.06 | 0.19 | 1.90 | 0.007 | 0.003 | 0.2 | 0.011 | 0.04 | 0.01 | 0.04 | 0.25 | 0.33 | 0.20 |
|  |  |  | External | 0.07 | 0.23 | 1.84 | 0.006 | 0.003 | 0.2 | 0.010 | 0.03 | 0.01 | 0.04 | 0.31 | 0.15 | 0.18 |
| 8 | 8 | E* | Internal | 0.05 | 0.15 | 1.50 | 0.006 | 0.003 | 0.1 | 0.012 | 0.04 | 0.04 | 0.04 | 0.02 | 0.05 | — |
|  |  |  | External | 0.07 | 0.18 | 1.67 | 0.006 | 0.003 | 0.2 | 0.011 | 0.02 | 0.03 | 0.02 | 0.02 | 0.04 | — |
| 9 | 9 | F* | Internal | 0.06 | 0.25 | 1.90 | 0.006 | 0.003 | 0.4 | 0.019 | 0.03 | 0.04 | 0.03 | 0.35 | 0.55 | 0.33 |
|  |  |  | External | 0.07 | 0.26 | 1.96 | 0.006 | 0.003 | 0.4 | 0.022 | 0.04 | 0.04 | 0.04 | 0.35 | 0.75 | 0.45 |
| 10 | 10 | G* | Internal | 0.06 | 0.19 | 1.89 | 0.008 | 0.003 | 0.3 | 0.014 | 0.02 | 0.04 | 0.04 | 0.26 | 0.52 | 0.36 |
|  |  |  | External | 0.06 | 0.25 | 1.94 | 0.008 | 0.002 | 0.3 | 0.018 | 0.02 | 0.01 | 0.03 | 0.22 | 0.59 | 0.41 |

Note 1:
*indicates out of the scope of the present invention.
Note 2:
$P_{CM} = C + Si/30 + Mn/20 + Cu/20 + Ni/60 + Cr/20 + Mo/15 + V/10 + 5*B$ (each element symbol represents content (mass %).)

TABLE 3-2

(mass %)

| Steel pipe | Steel plate | Steel type | | Ca | REM | Zr | Mg | B | N | O | $P_{CM}$ (%) |
|---|---|---|---|---|---|---|---|---|---|---|---|
| 1-1 | 1 | A | Internal | — | — | — | — | 0.0011 | 0.003 | 0.022 | 0.25 |
| | | | External | — | — | — | — | 0.0016 | 0.004 | 0.018 | 0.26 |
| 2-1 | 2 | B | Internal | 0.002 | 0.001 | — | — | 0.0010 | 0.004 | 0.017 | 0.24 |
| | | | External | 0.002 | 0.001 | — | 0.001 | 0.0016 | 0.004 | 0.028 | 0.25 |
| 3-1 | 3 | C | Internal | 0.002 | — | — | — | 0.0021 | 0.005 | 0.021 | 0.28 |
| | | | External | 0.003 | — | — | — | 0.0023 | 0.004 | 0.036 | 0.29 |
| 4 | 4 | A | Internal | 0.002 | — | — | — | 0.0012 | 0.004 | 0.017 | 0.24 |
| | | | External | 0.002 | — | — | — | 0.0014 | 0.004 | 0.026 | 0.24 |
| 5 | 5 | B | Internal | — | — | — | — | 0.0012 | 0.004 | 0.023 | 0.24 |
| | | | External | — | — | — | — | 0.0014 | 0.004 | 0.024 | 0.25 |
| 6 | 6 | C | Internal | 0.001 | — | — | — | 0.0016 | 0.005 | 0.021 | 0.22 |
| | | | External | 0.001 | — | 0.001 | — | 0.0015 | 0.004 | 0.027 | 0.23 |
| 1-2 | 1 | A | Internal | 0.002 | 0.001 | — | — | 0.0019 | 0.004 | 0.036 | 0.25 |
| | | | External | 0.002 | — | — | 0.001 | 0.0017 | 0.004 | 0.037 | 0.25 |
| 2-2 | 2 | B | Internal | 0.002 | — | — | — | 0.0011 | 0.004 | 0.019 | 0.24 |
| | | | External | 0.001 | — | — | — | 0.0014 | 0.005 | 0.024 | 0.24 |
| 3-2 | 3 | C | Internal | 0.002 | — | — | — | 0.0015 | 0.004 | 0.022 | 0.26 |
| | | | External | 0.001 | — | — | — | 0.0016 | 0.004 | 0.024 | 0.28 |
| 7 | 7 | D* | Internal | 0.002 | — | — | — | 0.0025 | 0.004 | 0.028 | 0.22 |
| | | | External | 0.002 | — | — | — | 0.0032 | 0.004 | 0.017 | 0.23 |
| 8 | 8 | E* | Internal | 0.002 | — | — | — | 0.0011 | 0.004 | 0.026 | 0.15 |
| | | | External | 0.002 | — | — | — | 0.0008 | 0.004 | 0.042 | 0.16 |
| 9 | 9 | F* | Internal | 0.002 | — | — | — | 0.0015 | 0.004 | 0.026 | 0.25 |
| | | | External | 0.002 | — | — | — | 0.0012 | 0.004 | 0.026 | 0.27 |
| 10 | 10 | G* | Internal | 0.002 | — | — | — | 0.0011 | 0.004 | 0.019 | 0.23 |
| | | | External | 0.002 | — | — | — | 0.0014 | 0.005 | 0.024 | 0.23 |

Note 1:
*indicates out of the scope of the present invention.

Note 2:
$P_{CM}$ = C + Si/30 + Mn/20 + Cu/20 + Ni/60 + Cr/20 + Mo/15 + V/10 + 5 * B (each element symbol represents content (mass %).)

TABLE 4-1

| | | | | Base material portion $P_{CM}$ (%) | Welding heat input (kJ/cm) | | Steel pipe joint portion | | | | | | | |
|---|---|---|---|---|---|---|---|---|---|---|---|---|---|---|
| | | | | | | | Tensile characteristic Tensile strength (MPa) | Microstructure of external CGHAZ | | | | HAZ toughness | | |
| | | | | | | | | Lower bainite structure fraction (%) | Martensite structure fraction (%) | Upper bainite structure fraction (%) | External CGHAZ HV (98N) | External FL vE-30 (J) | Root-FL vE-30 (J) | |
| Test | Steel pipe | Steel plate | Steel type | | | | | | | | | | | Class |
| 1 | 1-1 | 1 | A | 0.19 | Internal | 50 | 811 | 80 | 0 | 20 | 285 | 164 | 105 | Invention example |
| | | | | | External | 54 | | | | | | | | |
| 2 | 2-1 | 2 | B | 0.20 | Internal | 46 | 783 | 70 | 0 | 30 | 265 | 119 | 144 | |
| | | | | | External | 46 | | | | | | | | |
| 3 | 3-1 | 3 | C | 0.21 | Internal | 52 | 845 | 70 | 10 | 20 | 275 | 136 | 108 | |
| | | | | | External | 72 | | | | | | | | |
| 4 | 4 | 4 | A | 0.19 | Internal | 74 | 886 | 70 | 10 | 20 | 284 | 145 | 154 | Comparative example |
| | | | | | External | 78 | | | | | | | | |
| 5 | 5 | 5 | B | 0.20 | Internal | 60 | 868 | 60 | 40 | 0 | 325 | 134 | 114 | |
| | | | | | External | 70 | | | | | | | | |
| 6 | 6 | 6 | C | 0.21 | Internal | 45 | 820 | 90 | 0 | 10 | 302 | 154 | 162 | |
| | | | | | External | 50 | | | | | | | | |
| 7 | 1-2 | 1 | A | 0.19 | Internal | 82 | 794 | 20* | 0 | 80 | 243 | 72 | 54 | |
| | | | | | External | 82 | | | | | | | | |
| 8 | 2-2 | 2 | B | 0.20 | Internal | 85 | 760 | 10* | 0 | 90 | 220 | 45 | 42 | |
| | | | | | External | 85 | | | | | | | | |
| 9 | 3-2 | 3 | C | 0.21 | Internal | 95 | 822 | 30* | 0 | 70 | 235 | 64 | 32 | |
| | | | | | External | 95 | | | | | | | | |
| 10 | 7 | 7 | D* | 0.20 | Internal | 60 | 825 | 0* | 0 | 100 | 245 | 31 | 28 | |
| | | | | | External | 60 | | | | | | | | |
| 11 | 8 | 8 | E* | 0.15* | Internal | 52 | 660 | 20* | 0 | 80 | 231 | 24 | 32 | |
| | | | | | External | 52 | | | | | | | | |
| 12 | 9 | 9 | F* | 0.26* | Internal | 60 | 877 | 0* | 100 | 0 | 381 | 36 | 44 | |
| | | | | | External | 68 | | | | | | | | |
| 13 | 10 | 10 | G* | 0.21 | Internal | 80 | 776 | 60 | 0 | 40 | 275 | 104 | 37 | |
| | | | | | External | 60 | | | | | | | | |

Note 1:
*indicates out of the scope of the present invention.

Note 2:
CGHAZ: coarse-grain HAZ

TABLE 4-2

| | | | | Base material portion $P_{CM}$ (%) | Welding heat input (kJ/cm) | | Steel pipe base material portion | | | | | | | |
|---|---|---|---|---|---|---|---|---|---|---|---|---|---|---|
| | | | | | | | Microstructure of base material | | | Tensile characteristics | | | Toughness | | |
| Test | Steel pipe | Steel plate | Steel type | | | | MA fraction in bainite structure (%) | Long axis size of MA in bainite structure (μm) | Long axis size of bainitic ferrite (μm) | Tensile strength (MPa) | Yield ratio (%) | Uniform elongation (%) | vE-40° C. (J) | DWTT SA-20° C. (%) | Class |
| 1 | 1-1 | 1 | A | 0.19 | Internal External | 50 54 | 5 | 1.5 | 17 | 802 | 76 | 8.2 | 256 | 100 | Invention example |
| 2 | 2-1 | 2 | B | 0.20 | Internal External | 46 46 | 7 | 1.2 | 15 | 822 | 74 | 9.8 | 275 | 95 | |
| 3 | 3-1 | 3 | C | 0.21 | Internal External | 52 72 | 6 | 1.8 | 12 | 840 | 78 | 8.1 | 228 | 100 | |
| 4 | 4 | 4 | A | 0.19 | Internal External | 74 78 | 8 | 2.9 | 26 | 844 | 81 | 7.3 | 174* | 85 | Comparative example |
| 5 | 5 | 5 | B | 0.20 | Internal External | 60 70 | 12 | 3.4 | 32 | 880 | 81 | 5.5 | 180* | 72 | |
| 6 | 6 | 6 | C | 0.21 | Internal External | 45 50 | 10 | 2.8 | 33 | 825 | 82 | 7.8 | 159* | 90 | |
| 7 | 1-2 | 1 | A | 0.19 | Internal External | 82 82 | 5 | 1.8 | 15 | 815 | 76 | 7.8 | 296 | 100 | |
| 8 | 2-2 | 2 | B | 0.20 | Internal External | 85 85 | 6 | 2.0 | 16 | 870 | 75 | 9.6 | 274 | 95 | |
| 9 | 3-2 | 3 | C | 0.21 | Internal External | 95 95 | 6 | 1.4 | 13 | 870 | 80 | 7.1 | 244 | 92 | |
| 10 | 7 | 7 | D* | 0.20 | Internal External | 60 60 | 9 | 1.9 | 15 | 810 | 78 | 6.8 | 254 | 95 | |
| 11 | 8 | 8 | E* | 0.15* | Internal External | 52 52 | 4 | 1.7 | 14 | 600* | 76 | 9.5 | 288 | 100 | |
| 12 | 9 | 9 | F* | 0.26* | Internal External | 60 68 | 15 | 1.5 | 18 | 880 | 81 | 5.5 | 154* | 86 | |
| 13 | 10 | 10 | G* | 0.21 | Internal External | 80 60 | 5 | 1.9 | 18 | 785 | 82 | 7.8 | 233 | 100 | |

Note 1:
*indicates out of the scope of the present invention.
Note 2:
CGHAZ: coarse-grain HAZ

TABLE 5

(mass %)

| Steel type | C | Si | Mn | P | S | Mo | Ti | Nb | V | Al | Cu | Ni | Cr |
|---|---|---|---|---|---|---|---|---|---|---|---|---|---|
| H | 0.061 | 0.15 | 1.81 | 0.004 | 0.0010 | 0.25 | 0.012 | 0.010 | — | 0.03 | 0.20 | 0.22 | 0.21 |
| I | 0.064 | 0.05 | 1.88 | 0.007 | 0.0022 | 0.33 | 0.012 | 0.025 | — | 0.04 | 0.31 | 0.32 | — |
| J | 0.068 | 0.08 | 1.90 | 0.005 | 0.0005 | 0.35 | 0.012 | 0.022 | — | 0.03 | 0.35 | 0.36 | 0.02 |
| K | 0.070 | 0.02 | 1.84 | 0.005 | 0.0008 | 0.35 | 0.014 | 0.020 | — | 0.04 | 0.32 | 0.35 | 0.02 |
| L* | 0.062 | 0.06 | 1.88 | 0.007 | 0.0010 | 0.20 | 0.011 | 0.024 | — | 0.04 | 0.31 | 0.15 | 0.20 |
| M* | 0.052 | 0.25 | 1.72 | 0.006 | 0.0011 | 0.10 | 0.012 | 0.018 | 0.042 | 0.04 | 0.02 | 0.05 | — |
| N* | 0.068 | 0.16 | 1.88 | 0.006 | 0.0011 | 0.44 | 0.012 | 0.022 | 0.042 | 0.04 | 0.35 | 0.75 | 0.45 |
| O* | 0.064 | 0.04 | 1.78 | 0.002 | 0.0009 | 0.30 | 0.012 | 0.033* | — | 0.03 | 0.20 | 0.70 | 0.20 |

| Steel type | Ca | REM | Zr | Mg | B | N | O | $P_{CM}$ (%) |
|---|---|---|---|---|---|---|---|---|
| H | — | — | 0.002 | — | 0.0007 | 0.004 | 0.002 | 0.20 |
| I | 0.0017 | 0.001 | — | 0.001 | 0.0010 | 0.003 | 0.002 | 0.21 |
| J | 0.0032 | — | — | — | 0.0009 | 0.005 | 0.002 | 0.22 |
| K | 0.0025 | — | — | — | 0.0012 | 0.005 | 0.003 | 0.21 |
| L* | 0.0015 | — | — | — | — | 0.004 | 0.002 | 0.20 |
| M* | 0.0021 | — | — | — | 0.0008 | 0.004 | 0.003 | 0.16* |
| N* | 0.0021 | — | — | — | 0.0012 | 0.004 | 0.003 | 0.26* |
| O* | 0.0010 | — | — | — | 0.0008 | 0.004 | 0.002 | 0.21 |

Note 1:
*indicates out of the scope of the present invention.
Note 2:
$P_{CM}$ = C + Si/30 + Mn/20 + Cu/20 + Ni/60 + Cr/20 + Mo/15 + V/10 + 5 * B (each element symbol represents content (mass %).)

TABLE 6

| Steel plate | Steel type | Heating temperature (° C.) | Cumulative rolling reduction at more than 950° C. (%) | Cumulative rolling reduction of 950-750° C. (%) | Cumulative rolling reduction at 750° C. or less (%) | Finish rolling temperature (° C.) | Cooling rate (° C./S) | Cooling stopping temperature (° C.) | Reheating rate (° C./S) | Reheating temperature (° C.) | plate thickness (mm) |
|---|---|---|---|---|---|---|---|---|---|---|---|
| 11 | H | 1120 | 15 | 20 | 80 | 720 | 24 | 500 | 6 | 650 | 26 |
| 12 | I | 1150 | 20 | 25 | 75 | 710 | 28 | 580 | 12 | 640 | 36 |
| 13 | J | 1050 | 16 | 20 | 75 | 680 | 27 | 540 | 3 | 650 | 32 |
| 14 | J | 1050 | 30 | 0 | 80 | 680 | 27 | 540 | 3 | 650 | 25 |
| 15 | K | 1100 | 38 | 20 | 80 | 680 | 45 | 550 | 7 | 620 | 20 |
| 16 | H | 1100 | 45 | 45 | 50* | 720 | 30 | 500 | 2 | 630 | 26 |
| 17 | 1 | 1080 | 50 | 20 | 60* | 720 | 22 | 510 | 3 | 650 | 36 |
| 18 | J | 1050 | 15 | 22 | 70* | 710 | 26 | 520 | 6 | 640 | 32 |
| 19 | K | 1100 | 70 | 20 | 60* | 690 | 43 | 540 | 8 | 640 | 20 |
| 20 | L* | 1120 | 15 | 25 | 75 | 720 | 32 | 560 | 10 | 650 | 26 |
| 21 | M* | 1050 | 10 | 20 | 80 | 700 | 30 | 550 | 5 | 650 | 36 |
| 22 | N* | 1040 | 15 | 22 | 77 | 720 | 24 | 520 | 1 | 650 | 28 |
| 23 | O* | 1100 | 20 | 25 | 75 | 710 | 27 | 550 | 3 | 650 | 32 |
| 24 | J | 1050 | 30 | 0 | 80 | 680 | 36 | 360* | 3 | 650 | 25 |

Note:
*indicates out of the scope of the present invention.

TABLE 7-1

(mass %)

| Steel pipe | Steel plate | Steel type | | C | Si | Mn | P | S | Mo | Ti | Nb | V | Al | Cu | Ni |
|---|---|---|---|---|---|---|---|---|---|---|---|---|---|---|---|
| 11-1 | 11 | H | Internal | 0.07 | 0.21 | 1.90 | 0.007 | 0.003 | 0.7 | 0.014 | 0.041 | 0.032 | 0.02 | 0.34 | 0.50 |
| | | | External | 0.06 | 0.22 | 1.92 | 0.006 | 0.003 | 0.8 | 0.016 | 0.023 | 0.041 | 0.03 | 0.43 | 1.00 |
| 12-1 | 12 | I | Internal | 0.06 | 0.23 | 1.96 | 0.010 | 0.003 | 0.4 | 0.011 | 0.044 | 0.062 | 0.04 | 0.31 | 1.80 |
| | | | External | 0.08 | 0.24 | 1.92 | 0.008 | 0.003 | 0.5 | 0.020 | 0.013 | — | 0.04 | 0.15 | 1.45 |
| 13-1 | 13 | J | Internal | 0.07 | 0.23 | 1.84 | 0.006 | 0.003 | 0.6 | 0.019 | 0.044 | 0.022 | 0.02 | 0.40 | 0.94 |
| | | | External | 0.06 | 0.25 | 1.91 | 0.006 | 0.003 | 0.7 | 0.022 | 0.048 | 0.021 | 0.02 | 0.55 | 0.88 |
| 14 | 14 | J | Internal | 0.06 | 0.21 | 1.88 | 0.005 | 0.002 | 0.5 | 0.019 | 0.044 | 0.020 | 0.02 | 0.52 | 1.44 |
| | | | External | 0.06 | 0.24 | 1.86 | 0.005 | 0.003 | 0.5 | 0.020 | 0.031 | 0.012 | 0.02 | 0.54 | 1.62 |
| 15-1 | 15 | K | Internal | 0.06 | 0.23 | 1.86 | 0.005 | 0.002 | 0.6 | 0.020 | 0.044 | 0.021 | 0.03 | 0.41 | 0.92 |
| | | | External | 0.06 | 0.22 | 1.94 | 0.005 | 0.002 | 0.6 | 0.021 | 0.040 | 0.020 | 0.03 | 0.52 | 0.90 |
| 16 | 16* | H | Internal | 0.06 | 0.22 | 1.97 | 0.009 | 0.003 | 0.5 | 0.014 | 0.030 | 0.040 | 0.04 | 0.24 | 0.85 |
| | | | External | 0.07 | 0.22 | 1.92 | 0.008 | 0.002 | 0.5 | 0.018 | 0.022 | — | 0.03 | 0.17 | 1.44 |
| 17 | 17* | I | Internal | 0.07 | 0.16 | 1.92 | 0.007 | 0.003 | 0.6 | 0.014 | 0.038 | 0.029 | 0.03 | 0.32 | 0.48 |
| | | | External | 0.07 | 0.21 | 1.94 | 0.006 | 0.002 | 0.6 | 0.015 | 0.030 | 0.041 | 0.03 | 0.47 | 0.45 |
| 18 | 18* | J | Internal | 0.07 | 0.24 | 2.10 | 0.008 | 0.003 | 0.3 | 0.020 | 0.023 | 0.010 | 0.04 | 0.15 | 1.25 |
| | | | External | 0.08 | 0.23 | 2.23 | 0.006 | 0.003 | 0.4 | 0.022 | 0.038 | 0.012 | 0.02 | 0.23 | 1.20 |
| 19 | 19* | K | Internal | 0.07 | 0.21 | 2.10 | 0.008 | 0.003 | 0.5 | 0.020 | 0.022 | 0.010 | 0.04 | 0.15 | 1.22 |
| | | | External | 0.07 | 0.20 | 2.12 | 0.006 | 0.003 | 0.5 | 0.022 | 0.041 | 0.012 | 0.02 | 0.23 | 1.24 |

| Steel pipe | Steel plate | Steel type | | Cr | Ca | REM | Zr | Mg | B | N | O | $P_{CM}$ (%) |
|---|---|---|---|---|---|---|---|---|---|---|---|---|
| 11-1 | 11 | H | Internal | 0.28 | — | — | — | — | 0.0011 | 0.003 | 0.022 | 0.27 |
| | | | External | 0.24 | — | — | — | — | 0.0016 | 0.004 | 0.018 | 0.28 |
| 12-1 | 12 | I | Internal | 0.48 | 0.002 | 0.001 | — | — | 0.0010 | 0.004 | 0.017 | 0.28 |
| | | | External | 0.40 | 0.002 | 0.001 | — | 0.001 | 0.0016 | 0.004 | 0.028 | 0.28 |
| 13-1 | 13 | J | Internal | 0.22 | 0.002 | — | 0.001 | — | 0.0021 | 0.005 | 0.021 | 0.27 |
| | | | External | 0.33 | 0.003 | — | — | — | 0.0023 | 0.004 | 0.036 | 0.26 |
| 14 | 14 | J | Internal | 0.36 | 0.002 | — | — | — | 0.0021 | 0.005 | 0.021 | 0.27 |
| | | | External | 0.42 | 0.002 | — | — | — | 0.0016 | 0.004 | 0.036 | 0.28 |
| 15-1 | 15 | K | Internal | 0.24 | 0.002 | — | — | — | 0.0021 | 0.005 | 0.027 | 0.26 |
| | | | External | 0.31 | 0.002 | — | — | — | 0.0013 | 0.004 | 0.034 | 0.27 |
| 16 | 16* | H | Internal | 0.41 | 0.002 | — | — | — | 0.0012 | 0.004 | 0.017 | 0.26 |
| | | | External | 0.45 | 0.002 | — | — | — | 0.0014 | 0.004 | 0.026 | 0.27 |
| 17 | 17* | I | Internal | 0.26 | — | — | — | — | 0.0012 | 0.004 | 0.023 | 0.26 |
| | | | External | 0.24 | — | — | — | — | 0.0014 | 0.004 | 0.024 | 0.27 |
| 18 | 18* | J | Internal | 0.40 | 0.001 | — | — | — | 0.0016 | 0.005 | 0.021 | 0.26 |
| | | | External | 0.35 | 0.001 | — | 0.001 | — | 0.0015 | 0.004 | 0.027 | 0.28 |
| 19 | 19* | K | Internal | 0.32 | 0.001 | — | — | — | 0.0018 | 0.003 | 0.024 | 0.27 |
| | | | External | 0.36 | 0.002 | — | — | — | 0.0014 | 0.005 | 0.025 | 0.27 |

Note 1:
*indicates out of the scope of the present invention.
Note 2:
$P_{CM}$ = C + Si/30 + Mn/20 + Cu/20 + Ni/60 + Cr/20 + Mo/15 + V/10 + 5 * B (each element symbol represents content (mass %).)

TABLE 7-2

(mass %)

| Steel pipe | Steel plate | Steel type | | C | Si | Mn | P | S | Mo | Ti | Nb | V | Al | Cu | Ni |
|---|---|---|---|---|---|---|---|---|---|---|---|---|---|---|---|
| 11-2 | 11 | H | Internal | 0.07 | 0.10 | 1.90 | 0.007 | 0.003 | 0.2 | 0.014 | 0.040 | 0.030 | 0.02 | 0.54 | 0.80 |
|  |  |  | External | 0.08 | 0.23 | 1.62 | 0.006 | 0.003 | 0.2 | 0.016 | 0.030 | 0.040 | 0.03 | 0.33 | 1.36 |
| 12-2 | 12 | I | Internal | 0.07 | 0.19 | 1.91 | 0.007 | 0.003 | 0.5 | 0.015 | 0.021 | 0.040 | 0.03 | 0.26 | 0.47 |
|  |  |  | External | 0.07 | 0.23 | 1.92 | 0.006 | 0.002 | 0.6 | 0.016 | 0.022 | 0.012 | 0.03 | 0.22 | 0.55 |
| 13-2 | 13 | J | Internal | 0.06 | 0.23 | 2.12 | 0.006 | 0.003 | 0.5 | 0.020 | 0.040 | 0.020 | 0.02 | 0.65 | 0.95 |
|  |  |  | External | 0.07 | 0.19 | 2.31 | 0.006 | 0.003 | 0.5 | 0.023 | 0.040 | 0.030 | 0.04 | 0.55 | 1.20 |
| 15-2 | 15 | K | Internal | 0.06 | 0.25 | 1.95 | 0.006 | 0.003 | 0.5 | 0.020 | 0.040 | 0.020 | 0.02 | 0.62 | 0.92 |
|  |  |  | External | 0.07 | 0.24 | 2.24 | 0.006 | 0.003 | 0.3 | 0.023 | 0.040 | 0.030 | 0.04 | 0.53 | 1.10 |
| 20 | 20 | L* | Internal | 0.06 | 0.19 | 1.90 | 0.007 | 0.003 | 0.6 | 0.011 | 0.044 | 0.010 | 0.04 | 0.25 | 1.23 |
|  |  |  | External | 0.07 | 0.23 | 1.84 | 0.006 | 0.003 | 0.6 | 0.010 | 0.030 | 0.010 | 0.04 | 0.31 | 0.85 |
| 21 | 21 | M* | Internal | 0.05 | 0.15 | 1.50 | 0.006 | 0.003 | 0.3 | 0.012 | 0.038 | 0.042 | 0.04 | 0.02 | 0.05 |
|  |  |  | External | 0.07 | 0.18 | 1.67 | 0.006 | 0.003 | 0.2 | 0.011 | 0.020 | 0.030 | 0.02 | 0.02 | 0.04 |
| 22 | 22 | N* | Internal | 0.06 | 0.25 | 1.90 | 0.006 | 0.003 | 0.7 | 0.019 | 0.030 | 0.042 | 0.03 | 0.35 | 1.55 |
|  |  |  | External | 0.07 | 0.26 | 1.96 | 0.006 | 0.003 | 0.6 | 0.022 | 0.038 | 0.042 | 0.04 | 0.35 | 1.75 |
| 23 | 23 | O* | Internal | 0.06 | 0.19 | 1.99 | 0.008 | 0.003 | 0.5 | 0.014 | 0.020 | 0.040 | 0.04 | 0.26 | 0.92 |
|  |  |  | External | 0.07 | 0.25 | 1.94 | 0.008 | 0.002 | 0.6 | 0.018 | 0.020 | 0.010 | 0.03 | 0.22 | 1.18 |
| 24 | 24 | J | Internal | 0.07 | 0.22 | 2.04 | 0.007 | 0.002 | 0.3 | 0.020 | 0.024 | 0.015 | 0.04 | 0.15 | 1.45 |
|  |  |  | External | 0.07 | 0.21 | 2.25 | 0.005 | 0.003 | 0.4 | 0.022 | 0.039 | 0.021 | 0.02 | 0.23 | 1.60 |

| Steel pipe | Steel plate | Steel type | | Cr | Ca | REM | Zr | Mg | B | N | O | $P_{CM}$ (%) |
|---|---|---|---|---|---|---|---|---|---|---|---|---|
| 11-2 | 11 | H | Internal | 0.30 | 0.002 | 0.001 | — | — | 0.0019 | 0.004 | 0.036 | 0.25 |
|  |  |  | External | 0.22 | 0.002 | — | — | 0.001 | 0.0017 | 0.004 | 0.037 | 0.25 |
| 12-2 | 12 | I | Internal | 0.38 | 0.002 | — | — | — | 0.0011 | 0.004 | 0.019 | 0.25 |
|  |  |  | External | 0.38 | 0.001 | — | — | — | 0.0014 | 0.005 | 0.024 | 0.26 |
| 13-2 | 13 | J | Internal | 0.10 | 0.002 | — | — | — | 0.0015 | 0.004 | 0.022 | 0.27 |
|  |  |  | External | 0.12 | 0.001 | — | — | — | 0.0016 | 0.004 | 0.024 | 0.29 |
| 15-2 | 15 | K | Internal | 0.20 | 0.002 | — | — | — | 0.0021 | 0.004 | 0.025 | 0.27 |
|  |  |  | External | 0.22 | 0.002 | — | — | — | 0.0012 | 0.004 | 0.026 | 0.27 |
| 20 | 20 | L* | Internal | 0.22 | 0.002 | — | — | — | 0.0025 | 0.004 | 0.028 | 0.26 |
|  |  |  | External | 0.25 | 0.002 | — | — | — | 0.0032 | 0.004 | 0.017 | 0.27 |
| 21 | 21 | M* | Internal |  | 0.002 | — | — | — | 0.0011 | 0.004 | 0.026 | 0.16 |
|  |  |  | External |  | 0.002 | — | — | — | 0.0008 | 0.004 | 0.042 | 0.19 |
| 22 | 22 | N* | Internal | 0.28 | 0.002 | — | — | — | 0.0015 | 0.004 | 0.026 | 0.28 |
|  |  |  | External | 0.36 | 0.002 | — | — | — | 0.0012 | 0.004 | 0.026 | 0.29 |
| 23 | 23 | O* | Internal | 0.41 | 0.002 | — | — | — | 0.0011 | 0.004 | 0.019 | 0.26 |
|  |  |  | External | 0.36 | 0.002 | — | — | — | 0.0014 | 0.005 | 0.024 | 0.27 |
| 24 | 24 | J | Internal | 0.40 | 0.001 | — | — | — | 0.0016 | 0.005 | 0.021 | 0.26 |
|  |  |  | External | 0.35 | 0.001 | — | 0.001 | — | 0.0015 | 0.004 | 0.027 | 0.28 |

Note 1:
*indicates out of the scope of the present invention.
Note 2:
$P_{CM} = C + Si/30 + Mn/20 + Cu/20 + Ni/60 + Cr/20 + Mo/15 + V/10 + 5*B$ (each element symbol represents content (mass %).)

TABLE 8-1

| | | | | Base material portion $P_{CM}$ (%) | Welding heat input (kJ/cm) | | Steel pipe joint portion | | | | | | |
|---|---|---|---|---|---|---|---|---|---|---|---|---|---|
| | | | | | | | Tensile characteristic Tensile strength (MPa) | Microstructure of external CGHAZ | | | | HAZ toughness | |
| | | | | | | | | Lower bainite structure fraction (%) | Martensite structure fraction (%) | Upper bainite structure fraction (%) | External CGHAZ HV (98N) | External FL vE-30 (J) | Root-FL vE-30 (J) |
| Test | Steel pipe | Steel plate | Steel type | | | | | | | | | | |
| 14 | 11-1 | 11 | H | 0.20 | Internal | 40 | 831 | 65 | 0 | 35 | 265 | 124 | 122 |
|  |  |  |  |  | External | 45 |  |  |  |  |  |  |  |
| 15 | 12-1 | 12 | I | 0.21 | Internal | 46 | 823 | 72 | 0 | 28 | 275 | 147 | 135 |
|  |  |  |  |  | External | 46 |  |  |  |  |  |  |  |
| 16 | 13-1 | 13 | J | 0.22 | Internal | 52 | 850 | 80 | 10 | 10 | 294 | 168 | 148 |
|  |  |  |  |  | External | 65 |  |  |  |  |  |  |  |
| 17 | 14 | 14 | J | 0.22 | Internal | 38 | 846 | 80 | 5 | 15 | 292 | 155 | 118 |
|  |  |  |  |  | External | 43 |  |  |  |  |  |  |  |
| 18 | 15-1 | 15 | K | 0.21 | Internal | 35 | 834 | 75 | 5 | 20 | 281 | 165 | 134 |
|  |  |  |  |  | External | 38 |  |  |  |  |  |  |  |
| 19 | 16 | 16 | H | 0.20 | Internal | 44 | 845 | 70 | 6 | 24 | 274 | 132 | 104 |
|  |  |  |  |  | External | 48 |  |  |  |  |  |  |  |

TABLE 8-1-continued

| Test | Steel pipe | Steel plate | Steel type | Base material portion P_CM (%) | Welding heat input (kJ/cm) | | Tensile strength (MPa) | CGHAZ vE-40°C (J) | Softened zone vE-40°C (J) | | Weld metal vE-40°C (J) | Seam weld portion CGHAZ vE-40°C (J) | DWTT SA-20°C (%) |
|---|---|---|---|---|---|---|---|---|---|---|---|---|---|
| 20 | 17 | 17 | I | 0.21 | Internal | 50 | 828 | 74 | 26 | 0 | 285 | 144 | 124 |
|    |    |    |   |      | External | 50 |     |    |    |   |     |     |     |
| 21 | 18 | 18 | J | 0.22 | Internal | 55 | 852 | 82 | 0  | 18 | 302 | 154 | 172 |
|    |    |    |   |      | External | 60 |     |    |    |    |     |     |     |
| 22 | 19 | 19 | K | 0.21 | Internal | 38 | 842 | 81 | 0  | 18 | 278 | 122 | 110 |
|    |    |    |   |      | External | 44 |     |    |    |    |     |     |     |

| | | | | | | | Steel pipe base material portion Microstructure of base material | | | |
|---|---|---|---|---|---|---|---|---|---|---|
| Test | Steel pipe | Steel plate | Steel type | Base material portion P_CM (%) | Welding heat input (kJ/cm) | | MA fraction in bainite structure (%) | Long axis size of MA in bainite structure (μm) | Long axis size of bainitic ferrite (μm) | Class |
| 14 | 11-1 | 11 | H | 0.20 | Internal | 40 | 7 | 1.3 | 15 | Invention example |
|    |      |    |   |      | External | 45 |   |     |    |     |
| 15 | 12-1 | 12 | I | 0.21 | Internal | 46 | 9 | 1.8 | 16 | |
|    |      |    |   |      | External | 46 |   |     |    | |
| 16 | 13-1 | 13 | J | 0.22 | Internal | 52 | 8 | 1.4 | 10 | |
|    |      |    |   |      | External | 65 |   |     |    | |
| 17 | 14   | 14 | J | 0.22 | Internal | 38 | 7 | 1.5 | 14 | |
|    |      |    |   |      | External | 43 |   |     |    | |
| 18 | 15-1 | 15 | K | 0.21 | Internal | 35 | 6 | 1.2 | 12 | |
|    |      |    |   |      | External | 38 |   |     |    | |
| 19 | 16   | 16 | H | 0.20 | Internal | 44 | 8 | 3.2 | 35 | Comparative example |
|    |      |    |   |      | External | 48 |   |     |    | |
| 20 | 17   | 17 | I | 0.21 | Internal | 50 | 11 | 2.4 | 22 | |
|    |      |    |   |      | External | 50 |    |     |    | |
| 21 | 18   | 18 | J | 0.22 | Internal | 55 | 12 | 2.9 | 28 | |
|    |      |    |   |      | External | 60 |    |     |    | |
| 22 | 19   | 19 | K | 0.21 | Internal | 38 | 10 | 2.8 | 28 | |
|    |      |    |   |      | External | 44 |    |     |    | |

Note 1:
*indicates out of the scope of the present invention.
Note 2:
CGHAZ: coarse-grain HAZ

TABLE 8-2

| | | | | Base material portion P_CM (%) | Welding heat input (kJ/cm) | | Steel pipe base material portion (before ageing treatment) | | | | | |
|---|---|---|---|---|---|---|---|---|---|---|---|---|
| | | | | | | | Tensile characteristic | | | | Toughness | |
| Test | Steel pipe | Steel plate | Steel type | | | | Yield strength (MPa) | Tensile strength (MPa) | Yield ratio (%) | Uniform elongation (%) | vE-40°C (J) | DWTT SA-20°C (%) |
| 14 | 11-1 | 11 | H | 0.20 | Internal | 40 | 707 | 832 | 85 | 9.4 | 186 | 100 |
|    |      |    |   |      | External | 45 |     |     |    |     |     |     |
| 15 | 12-1 | 12 | I | 0.21 | Internal | 46 | 707 | 842 | 84 | 9.6 | 215 | 95 |
|    |      |    |   |      | External | 46 |     |     |    |     |     |    |
| 16 | 13-1 | 13 | J | 0.22 | Internal | 52 | 705 | 860 | 82 | 8.6 | 228 | 95 |
|    |      |    |   |      | External | 65 |     |     |    |     |     |    |
| 17 | 14   | 14 | J | 0.22 | Internal | 38 | 715 | 862 | 83 | 8.1 | 196 | 95 |
|    |      |    |   |      | External | 43 |     |     |    |     |     |    |
| 18 | 15-1 | 15 | K | 0.21 | Internal | 35 | 709 | 844 | 84 | 9.2 | 244 | 100 |
|    |      |    |   |      | External | 38 |     |     |    |     |     |     |
| 19 | 16   | 16 | H | 0.20 | Internal | 44 | 692 | 834 | 83 | 6.4 | 144* | 65 |
|    |      |    |   |      | External | 48 |     |     |    |     |      |    |
| 20 | 17   | 17 | I | 0.21 | Internal | 50 | 714 | 840 | 85 | 7.5 | 140* | 56 |
|    |      |    |   |      | External | 50 |     |     |    |     |      |    |
| 21 | 18   | 18 | J | 0.22 | Internal | 55 | 718 | 855 | 84 | 6.8 | 139* | 70 |
|    |      |    |   |      | External | 60 |     |     |    |     |      |    |
| 22 | 19   | 19 | K | 0.21 | Internal | 38 | 712 | 848 | 84 | 7.4 | 149* | 75 |
|    |      |    |   |      | External | 44 |     |     |    |     |      |    |

TABLE 8-2-continued

| | | | | | Steel pipe base material portion (after ageing treatment of 250° C. × 30 min) | | | | | | |
| | | | | | Tensile characteristic | | | | Toughness | | |
| Test | Steel pipe | Steel plate | Steel type | Base material portion $P_{CM}$ (%) | Welding heat input (kJ/cm) | Yield strength (MPa) | Tensile strength (MPa) | Yield ratio (%) | Uniform elongation (%) | vE-40° C. (J) | DWTT SA-20° C. (%) | Class |
|---|---|---|---|---|---|---|---|---|---|---|---|---|
| 14 | 11-1 | 11 | H | 0.20 | Internal 40 / External 45 | 706 | 830 | 85 | 8.4 | 182 | 95 | Invention example |
| 15 | 12-1 | 12 | I | 0.21 | Internal 46 / External 46 | 716 | 852 | 84 | 8.7 | 189 | 90 | |
| 16 | 13-1 | 13 | J | 0.22 | Internal 52 / External 65 | 723 | 871 | 83 | 8.2 | 176 | 95 | |
| 17 | 14 | 14 | J | 0.22 | Internal 38 / External 43 | 720 | 867 | 83 | 8.3 | 182 | 95 | |
| 18 | 15-1 | 15 | K | 0.21 | Internal 35 / External 38 | 718 | 865 | 83 | 8.6 | 222 | 95 | |
| 19 | 16 | 16 | H | 0.20 | Internal 44 / External 48 | 707 | 842 | 84 | 7.4 | 135 | 62 | Comparative example |
| 20 | 17 | 17 | I | 0.21 | Internal 50 / External 50 | 719 | 846 | 85 | 7.2 | 147 | 55 | |
| 21 | 18 | 18 | J | 0.22 | Internal 55 / External 60 | 727 | 866 | 84 | 6.6 | 144 | 66 | |
| 22 | 19 | 19 | K | 0.21 | Internal 38 / External 44 | 720 | 857 | 84 | 6.8 | 141 | 70 | |

Note 1:
*indicates out of the scope of the present invention.
Note 2:
CGHAZ: coarse-grain HAZ

TABLE 8-3

| | | | | | | Steel pipe joint portion | | | | | |
| | | | | | | | Microstructure of external CGHAZ | | | HAZ toughness | |
| Test | Steel pipe | Steel sheet | Steel type | Base material portion $P_{CM}$ (%?) | Welding heat input (kJ/cm) | Tensile characteristic Tensile strength (MPa ?) | Lower bainite structure fraction (%) | Martensite structure fraction (%) | Upper bainite structure fraction (%) | External CGHAZ HV?98N? | External FL vE-30 (J) | Root-FL vE-30 (J) |
|---|---|---|---|---|---|---|---|---|---|---|---|---|
| 23 | 11-2 | 11 | H | 0.20 | Internal 82 / External 82 | 814 | 16* | 0 | 84 | 226 | 42 | 34 |
| 24 | 12-2 | 12 | I | 0.21 | Internal 85 / External 85 | 830 | 30* | 0 | 70 | 234 | 35 | 22 |
| 25 | 13-2 | 13 | J | 0.22 | Internal 95 / External 95 | 872 | 22* | 0 | 78 | 245 | 24 | 12 |
| 26 | 15-2 | 15 | K | 0.21 | Internal 35 / External 82 | 852 | 32* | 0 | 68 | 233 | 34 | 27 |
| 27 | 20 | 20 | L* | 0.20 | Internal 60 / External 60 | 814 | 0* | 0 | 97 | 245 | 85 | 38 |
| 28 | 21 | 21 | M* | 0.16* | Internal 52 / External 52 | 710 | 15* | 0 | 85 | 221 | 36 | 52 |
| 29 | 22 | 22 | N* | 0.26* | Internal 60 / External 68 | 890 | 0* | 98 | 0 | 362 | 16 | 14 |
| 30 | 23 | 23 | O* | 0.21 | Internal 80 / External 60 | 825 | 54 | 0 | 46 | 272 | 110 | 32 |
| 31 | 24 | 24 | J | 0.22 | Internal 42 / External 45 | 856 | 76 | 0 | 24 | 295 | 158 | 142 |

| | | | | | Steel pipe base material portion Microstructure of base material | | | | |
| Test | Steel pipe | Steel sheet | Steel type | Base material portion $P_{CM}$ (%) | Welding heat input (kJ/cm) | MA fraction in bainite structure (%) | Long axis size of MA in bainite structure (μm) | Long axis size of bainite ferrite | Class |
|---|---|---|---|---|---|---|---|---|---|
| 23 | 11-2 | 11 | H | 0.20 | Internal 82 / External 82 | 6 | 1.4 | 13 | Comparative example |
| 24 | 12-2 | 12 | I | 0.21 | Internal 85 / External 85 | 7 | 2.0 | 16 | |

TABLE 8-3-continued

| | | | | | | | | | |
|---|---|---|---|---|---|---|---|---|---|
| 25 | 13-2 | 13 | J | 0.22 | Internal | 95 | 6 | 1.8 | 15 |
| | | | | | External | 95 | | | |
| 26 | 15-2 | 15 | K | 0.21 | Internal | 35 | 8 | 1.6 | 14 |
| | | | | | External | 82 | | | |
| 27 | 20 | 20 | L* | 0.20 | Internal | 60 | 8 | 1.6 | 15 |
| | | | | | External | 60 | | | |
| 28 | 21 | 21 | M* | 0.16* | Internal | 52 | 1 | 1.8 | 16 |
| | | | | | External | 52 | | | |
| 29 | 22 | 22 | N* | 0.26* | Internal | 60 | 12 | 1.9 | 18 |
| | | | | | External | 68 | | | |
| 30 | 23 | 23 | O* | 0.21 | Internal | 80 | 6 | 1.5 | 16 |
| | | | | | External | 60 | | | |
| 31 | 24 | 24 | J | 0.22 | Internal | 42 | 1* | 1.5 | 12 |
| | | | | | External | 45 | | | |

Note 1
?*indicates out of the scope of the present invention.
Note 2
?CGHAZ? coarse-grain HAZ

TABLE 8-4

| | | | | Base material portion $P_{CM}$ (%) | Welding heat input (kJ/cm) | | Steel pipe base material portion (before ageing treatment) | | | | | |
|---|---|---|---|---|---|---|---|---|---|---|---|---|
| | | | | | | | Tensile characteristics | | | | Toughness | |
| Test | Steel pipe | Steel plate | Steel type | | | | Yield strength (MPa) | Tensile strength (MPa) | Yield ratio (%) | Uniform elongation (%) | vE-40° C. (J) | DWTT SA-20° C. (%) |
| 23 | 11-2 | 11 | H | 0.20 | Internal | 82 | 697 | 820 | 85 | 8.2 | 196 | 95 |
| | | | | | External | 82 | | | | | | |
| 24 | 12-2 | 12 | I | 0.21 | Internal | 85 | 718 | 855 | 84 | 8.6 | 174 | 100 |
| | | | | | External | 85 | | | | | | |
| 25 | 13-2 | 13 | J | 0.22 | Internal | 95 | 716 | 884 | 81 | 7.4 | 164 | 90 |
| | | | | | External | 95 | | | | | | |
| 26 | 15-2 | 15 | K | 0.21 | Internal | 35 | 715 | 862 | 83 | 7.8 | 214 | 90 |
| | | | | | External | 82 | | | | | | |
| 27 | 20 | 20 | L* | 0.20 | Internal | 60 | 697 | 840 | 83 | 6.6 | 154 | 88 |
| | | | | | External | 60 | | | | | | |
| 28 | 21 | 21 | M* | 0.16* | Internal | 52 | 616 | 700* | 88* | 9.2 | 188 | 90 |
| | | | | | External | 52 | | | | | | |
| 29 | 22 | 22 | N* | 0.26* | Internal | 60 | 710 | 876 | 81 | 5.3 | 124* | 87 |
| | | | | | External | 68 | | | | | | |
| 30 | 23 | 23 | O* | 0.21 | Internal | 80 | 701 | 855 | 82 | 7.5 | 183 | 90 |
| | | | | | External | 60 | | | | | | |
| 31 | 24 | 24 | J | 0.22 | Internal | 42 | 721 | 838 | 86* | 6.1 | 177 | 85 |
| | | | | | External | 45 | | | | | | |

| | | | | Base material portion $P_{CM}$ (%) | Welding heat input (kJ/cm) | | Steel pipe base material portion (after ageing treatment of 250° C. × 30 min) | | | | | | |
|---|---|---|---|---|---|---|---|---|---|---|---|---|---|
| | | | | | | | Tensile characteristics | | | | Toughness | | |
| Test | Steel pipe | Steel plate | Steel type | | | | Yield strength (MPa) | Tensile strength (MPa) | Yield ratio (%) | Uniform elongation (%) | vE-40° C. (J) | DWTT SA-20° C. (%) | Class |
| 23 | 11-2 | 11 | H | 0.20 | Internal | 82 | 706 | 831 | 85 | 7.6 | 182 | 90 | Comparative example |
| | | | | | External | 82 | | | | | | | |
| 24 | 12-2 | 12 | I | 0.21 | Internal | 85 | 714 | 850 | 84 | 7.8 | 175 | 95 | |
| | | | | | External | 85 | | | | | | | |
| 25 | 13-2 | 13 | J | 0.22 | Internal | 95 | 718 | 876 | 82 | 8.1 | 158 | 95 | |
| | | | | | External | 95 | | | | | | | |
| 26 | 15-2 | 15 | K | 0.21 | Internal | 35 | 729 | 868 | 84 | 7.4 | 211 | 95 | |
| | | | | | External | 82 | | | | | | | |
| 27 | 20 | 20 | L* | 0.20 | Internal | 60 | 701 | 844 | 83 | 6.3 | 155 | 90 | |
| | | | | | External | 60 | | | | | | | |
| 28 | 21 | 21 | M* | 0.16* | Internal | 52 | 635 | 714 | 89 | 8.7 | 169 | 86 | |
| | | | | | External | 52 | | | | | | | |
| 29 | 22 | 22 | N* | 0.26* | Internal | 60 | 735 | 886 | 83 | 5.5 | 133 | 90 | |
| | | | | | External | 68 | | | | | | | |
| 30 | 23 | 23 | O* | 0.21 | Internal | 80 | 706 | 850 | 83 | 7.2 | 171 | 92 | |
| | | | | | External | 60 | | | | | | | |

TABLE 8-4-continued

| 31 | 24 | 24 | J | 0.22 | Internal | 42 | 744 | 845 | 88* | 5.6 | 185 | 85 |
|----|----|----|---|------|----------|----|-----|-----|-----|-----|-----|-----|
|    |    |    |   |      | External | 45 |     |     |     |     |     |     |

Note 1:
*indicates out of the scope of the present invention.
Note 2:
CGHAZ: coarse-grain HAZ

The invention claimed is:

1. A high strength steel pipe for low-temperature usage comprising:
   a base material portion in which a base material has a composition containing, in mass percentage,
   C: more than 0.03% and 0.08% or less,
   Si: 0.01% to 0.5%,
   Mn: 1.5% to 3.0%,
   P: 0.015% or less,
   S: 0.003% or less,
   Al: 0.01% to 0.08%,
   Nb: 0.005% to 0.025%,
   Ti: 0.005% to 0.025%,
   N: 0.001% to 0.010%,
   O: 0.005% or less, and
   B: 0.0003% to 0.0020%
   and one or more of
   Cu: 0.01% to 1%,
   Ni: 0.01% to 1%,
   Cr: 0.01% to 1%,
   Mo: 0.01% to 1%, and
   V: 0.01% to 0.1%,
   wherein a $P_{CM}$ value (in %) calculated by a formula (1) below satisfies $0.19 \leq P_{CM} \leq 0.25$, the balance is Fe and unavoidable impurities,
   the base material has a tensile strength of 760 MPa or more and 930 MPa or less, a uniform elongation of 5% or more, a yield ratio of 85% or less, a Charpy absorbed energy at a test temperature of −40° C. is 210 J or more when the plate thickness is less than 25 mm and is 150 J or more when the plate thickness is 25 mm or more, and a microstructure mainly constituted of bainite as a soft phase containing island martensite as a hard phase having an area fraction of 4% or more and 12% or less, the island martensite contained has a long axis size of 2 μm or less, and bainite surrounded by boundaries having a misorientation of 15° or more in the microstructure of the base material portion has a long axis size of 20 μm or less; and
   a weld metal portion in which weld metal for seam welding has a composition containing, in mass percentage,
   C: 0.03% to 0.10%,
   Si: 0.5% or less,
   Mn: 1.5% to 3.0%,
   P: 0.015% or less,
   S: 0.005% or less,
   Al: 0.05% or less,
   Nb: 0.005% to 0.05%,
   Ti: 0.005% to 0.03%,
   N: 0.010% or less,
   O: 0.015% to 0.045%, and
   B: 0.0003% to 0.0050%
   and one or more of
   Cu: 0.01% to 1%,
   Ni: 0.01% to 2.5%,
   Cr: 0.01% to 1%,
   Mo: 0.01% to 1.5%, and
   V: 0.1% or less, and
   the balance is Fe and unavoidable impurities,
   wherein a microstructure of a welded heat affected zone in which a prior austenite grain size is 50 μm or more near a fusion line in a seam weld zone of the steel pipe is a lower bainite structure or a multi-phase structure containing lower bainite having an area fraction of 50% or more and upper bainite and/or martensite, wherein $$P_{CM}(\%) = C + Si/30 + Mn/20 + Cu/20 + Ni/60 + Cr/20 + Mo/15 + V/10 + 5 \times B \quad (1)$$

where each element represents content (mass %).

2. The high strength steel pipe according to claim 1, wherein, in the seam weld zone of the steel pipe in which a layer on an internal side and a layer on an external side are welded in a longitudinal direction of the steel pipe, the welded heat affected zone near the fusion line on the external side has a hardness satisfying a formula (2) below, $$250 \leq HV(98N) \leq 350 \quad (2)$$

where HV(98N) represents a Vickers hardness measured with 10 kgf.

3. The high strength steel pipe according to claim 1, wherein the seam weld zone of the steel pipe has a joint strength of 760 MPa or more and 930 MPa or less.

4. The high strength steel pipe according to claim 1, wherein the chemical composition of the base material portion and/or the weld metal portion further contains, in mass percentage, one or more of
   Ca: 0.0005% to 0.1%,
   REM: 0.0005% to 0.02%,
   Zr: 0.0005% to 0.03%, and
   Mg: 0.0005% to 0.01%.

5. The high strength steel pipe according to claim 1, wherein the steel pipe has a uniform elongation of 5% or more and a yield ratio of 85% or less even after the steel pipe is subjected to a strain ageing treatment at a temperature of 250° C. or less for 30 minutes or less.

6. A method for producing a steel plate for a high strength steel pipe for low-temperature usage comprising:
   subjecting a steel having the base material composition according to claim 1 to hot rolling such that the steel is heated at a temperature of 1000° C. to 1300° C., a cumulative rolling reduction at more than 950° C. is 10% or more, a cumulative rolling reduction at 750° C. or less is 75% or more, and a finish rolling temperature is 650° C. or more;
   then subjecting the steel to accelerated cooling to a temperature of 450° C. or more and less than 650° C. at a cooling rate of 10° C./s or more; and
   immediately after the accelerated cooling, reheating the steel to a temperature of 500° C. to 750° C. at a heating rate of 0.5° C./s or more, the temperature being equal to or more than a stopping temperature of the accelerated cooling.

7. The method according to claim 6, wherein, in the hot rolling, a cumulative rolling reduction at a temperature of more than 750° C. and 950° C. or less is 20% or more.

8. A method for producing a high strength welded steel pipe for low-temperature usage, wherein the steel plate obtained by the method according to claim 6 is formed into a pipe shape, and, in welding of abutting portions of the formed steel plate by welding an internal layer and an external layer of the steel plate, internal welding heat input and external welding heat input is each 80 kJ/cm or less, and a heat input balance between the external heat input and the internal heat input satisfies a formula (3) below, internal heat input≤external heat input (3).

9. The method according to claim 8, wherein, after the internal layer and the external layer are welded in a longitudinal direction of the steel pipe, the steel pipe is subjected to pipe expansion at an expansion ratio of 0.4% or more and 2.0% or less.

10. The high strength steel pipe according to claim 2, wherein the seam weld zone of the steel pipe has a joint strength of 760 MPa or more and 930 MPa or less.

11. The high strength steel pipe according to claim 2, wherein the chemical composition of the base material portion and/or the weld metal portion further contains, in mass percentage, one or more of
Ca: 0.0005% to 0.1%,
REM: 0.0005% to 0.02%,
Zr: 0.0005% to 0.03%, and
Mg: 0.0005% to 0.01%.

12. The high strength steel pipe according to claim 3, wherein the chemical composition of the base material portion and/or the weld metal portion further contains, in mass percentage, one or more of
Ca: 0.0005% to 0.1%,
REM: 0.0005% to 0.02%,
Zr: 0.0005% to 0.03%, and
Mg: 0.0005% to 0.01%.

13. The high strength steel pipe according to claim 4, wherein the steel pipe has a uniform elongation of 5% or more and a yield ratio of 85% or less even after the steel pipe is subjected to a strain ageing treatment at a temperature of 250° C. or less for 30 minutes or less.

14. A method for producing a steel plate for a high strength steel pipe for low-temperature usage comprising:
subjecting a steel having the base material composition according to claim 2 to hot rolling such that the steel is heated at a temperature of 1000° C. to 1300° C., a cumulative rolling reduction at more than 950° C. is 10% or more, a cumulative rolling reduction at 750° C. or less is 75% or more, and a finish rolling temperature is 650° C. or more;
then subjecting the steel to accelerated cooling to a temperature of 450° C. or more and less than 650° C. at a cooling rate of 10° C./s or more; and
immediately after the accelerated cooling, reheating the steel to a temperature of 500° C. to 750° C. at a heating rate of 0.5° C./s or more, the temperature being equal to or more than a stopping temperature of the accelerated cooling.

15. A method for producing a steel plate for a high strength steel pipe for low-temperature usage comprising:
subjecting a steel having the base material composition according to claim 3 to hot rolling such that the steel is heated at a temperature of 1000° C. to 1300° C., a cumulative rolling reduction at more than 950° C. is 10% or more, a cumulative rolling reduction at 750° C. or less is 75% or more, and a finish rolling temperature is 650° C. or more;
then subjecting the steel to accelerated cooling to a temperature of 450° C. or more and less than 650° C. at a cooling rate of 10° C./s or more; and
immediately after the accelerated cooling, reheating the steel to a temperature of 500° C. to 750° C. at a heating rate of 0.5° C./s or more, the temperature being equal to or more than a stopping temperature of the accelerated cooling.

* * * * *